(12) United States Patent
Wang et al.

(10) Patent No.: US 12,548,074 B2
(45) Date of Patent: Feb. 10, 2026

(54) GENERATING USER INTERFACES COMPRISING DYNAMIC BASE LIMIT VALUE AND BASE LIMIT VALUE MODIFIER USER INTERFACE ELEMENTS DETERMINED FROM DIGITAL USER ACCOUNT ACTIONS

(71) Applicant: Chime Financial, Inc., San Francisco, CA (US)

(72) Inventors: Aoni Wang, Redwood City, CA (US); Erin Xie, San Francisco, CA (US)

(73) Assignee: Chime Financial, Inc., San Francisco, CA (US)

( * ) Notice: Subject to any disclaimer, the term of this patent is extended or adjusted under 35 U.S.C. 154(b) by 162 days.

(21) Appl. No.: 18/498,776

(22) Filed: Oct. 31, 2023

(65) Prior Publication Data

US 2025/0139695 A1    May 1, 2025

(51) Int. Cl.
*G06Q 40/02*    (2023.01)
(52) U.S. Cl.
CPC .................. *G06Q 40/02* (2013.01)
(58) Field of Classification Search
CPC ...................................... G06Q 40/02
See application file for complete search history.

(56) References Cited

U.S. PATENT DOCUMENTS

| 11,386,490 B1 * | 7/2022 | Plante ..................... H04L 67/04 |
| 2015/0379644 A1 * | 12/2015 | Danielak .............. G06Q 20/108 |
| | | 705/36 R |
| 2023/0139364 A1 | 5/2023 | Vemulapally et al. |

* cited by examiner

*Primary Examiner* — Elda G Milef
(74) *Attorney, Agent, or Firm* — Keller Preece PLLC

(57) ABSTRACT

The disclosure describes embodiments of systems, methods, and non-transitory computer readable storage media dynamically track, utilize, and display one or more base limit value modifiers to modify base limit values for user accounts, determined utilizing a variety of machine learning models and a base limit value model. For instance, the disclosed systems can utilize a variety of machine learning models and a base limit value model to generate a base limit value for a user account. Moreover, the disclosed systems can detect digital user account actions and generate base limit value modifiers for the digital user account actions. Furthermore, the disclosed systems can dynamically determine and display, utilizing a total base limit value modifier threshold, user interface elements indicating active base limit value modifiers that modify a displayed base limit value and/or inactive base limit value modifiers that do not affect the base limit value.

20 Claims, 19 Drawing Sheets

Display A Graphical User Interface Elements For The Available Base Limit Value And
The Base Limit Value Modifier 208

Available Base Limit Value

Base Limit Value Modifier

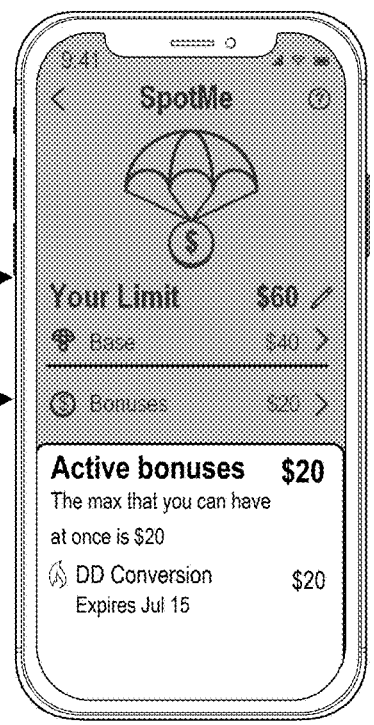

---

Display Graphical User Interface Elements For The Available Base Limit Value And
Active And Inactive Base Limit Value Modifiers 210

Available Base Limit Value

Active Base Limit Value Modifier(s)

Additional Base Limit Value Modifier

Modifier Threshold

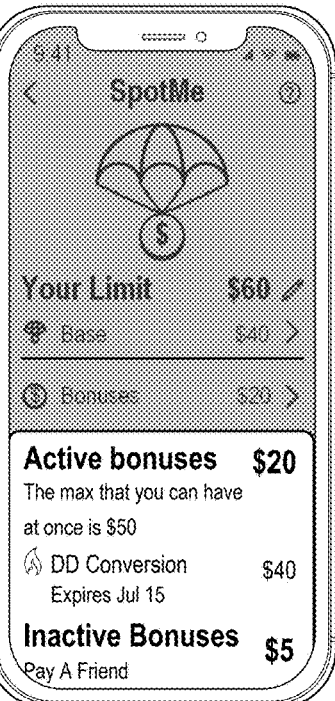

*Fig. 2B*

GENERATING USER INTERFACES COMPRISING DYNAMIC BASE LIMIT VALUE AND BASE LIMIT VALUE MODIFIER USER INTERFACE ELEMENTS DETERMINED FROM DIGITAL USER ACCOUNT ACTIONS

BACKGROUND

Recent years have seen a significant development in systems that utilize web-based and mobile-based applications to manage user accounts and digital information for user accounts in real time. For example, many conventional applications provide various graphical user interfaces (GUIs) to present digital information and options to client devices. This often includes determining or calculating account-specific values or limits and communicating such information via the web-based and mobile-based applications. Although conventional systems attempt to determine and communicate digital information to user accounts on web-based and mobile-based applications, such conventional systems face a number of technical shortcomings, particularly with regard to the flexibility and efficiency of user interfaces that display obscure, non-transparent outputs from computer-based models and other user interactions.

For example, many conventional systems utilize computer-based models that act as a black box mechanism and, as a result, provide outputs that are difficult to navigate within a GUI. For instance, conventional systems oftentimes utilized computer-based models that analyze a large number of variables and, without providing an understandable reasoning, generate a prediction or determination. Accordingly, many conventional systems are limited to rigid GUIs that are unable to provide insight into both determinations and how future or predicted actions will impact determinations of the computer-based models. In addition, conventional systems oftentimes are also unable to provide insight into impacts on user account values resulting from various user digital actions.

In addition, many conventional systems inefficiently utilize computational resources due to computer-based model outputs and the resulting inflexible user interfaces. For example, conventional systems often require navigation between multiple user interfaces to understand an output of a computer-based model and also to understand future actions (or behaviors) that would yield a particular outcome from the computer-based model. Indeed, in addition to receiving an obscure output from a computer-based model, many conventional systems fail to accurately visualize outputs from the computer-based models while also providing insight into the output within limited screen spaces of GUIs in mobile devices. In addition, such conventional systems also require substantial, inefficient navigation between multiple user interfaces to modify (or understand modifications) to output values on a user account.

Additionally, many conventional systems are unable to easily and efficiently track and display multiple modifiers for output values from computer-based models on user accounts. In particular, in many conventional systems, a wide variety of digital user actions may modify output values from computer-based models. In many cases, however, conventional systems are unable to easily and intuitively display a wide variety of modifications to output values and also unable to track when one or more modifications to the output values are applicable.

Furthermore, many conventional systems are unable to accurately determine account-specific values or limits through computer models. For example, conventional systems fail to accurately determine account-specific limits that accurately reflect underlying risks based on numerous factors or variables corresponding to digital accounts.

SUMMARY

This disclosure describes one or more embodiments of systems, methods, and non-transitory computer readable media that provide benefits and solve one or more of the foregoing or other problems by dynamically tracking, utilizing, and intuitively displaying one or more base limit value modifiers to modify base limit values for user accounts, determined utilizing a variety of machine learning models and a base limit value model. Indeed, in one or more implementations, the disclosed systems can utilize a variety of machine learning models and a base limit value model to generate user interface elements that transparently and efficiently present current and future base limit values for user accounts (reflecting a value limit for excess account withdrawals). Moreover, the disclosed systems can detect one or more digital user account actions and generate one or more base limit value modifiers for the digital user account actions. Indeed, the disclosed systems can dynamically determine and display, utilizing a total base limit value modifier threshold, user interface elements indicating one or more active base limit value modifiers that modify a displayed base limit value and/or one or more inactive base limit value modifiers that do not affect the base limit value. In particular, the disclosed systems can transparently and efficiently present active and/or inactive base limit value modifiers based on digital user actions within a single graphical user interface in addition to the determined base limit value.

BRIEF DESCRIPTION OF THE DRAWINGS

The detailed description is described with reference to the accompanying drawings in which:

FIGS. 2A-2B illustrate an overview of a dynamic base limit value modification system generating and displaying base limit value modifiers for a user account in accordance with one or more implementations.

DETAILED DESCRIPTION

Figure 1:
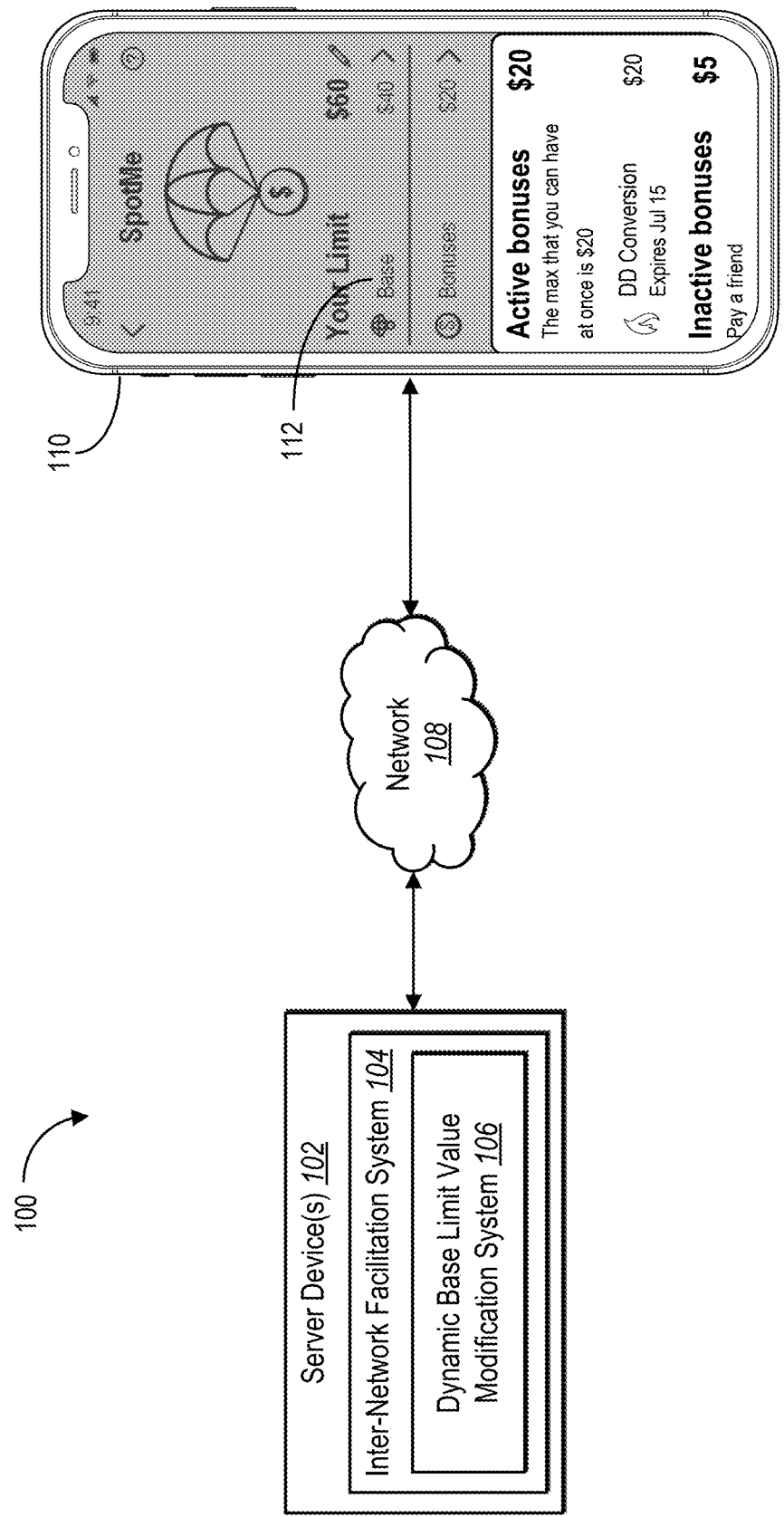
FIG. 1 illustrates a schematic diagram of an environment for implementing an inter-network facilitation system and a dynamic base limit value modification system in accordance with one or more implementations.

The disclosure describes on or more embodiments of a dynamic base limit value modification system that generates one or more base limit value modifiers for digital user account actions to actively and/or inactively affect a determined base limit value for a user account. For example, the dynamic base limit value modification system can utilize a variety of machine learning models and a base limit value model to generate user interface elements that transparently and efficiently present current and future base limit values for user accounts. Moreover, the dynamic base limit value modification system can dynamically determine and display user interface elements indicating one or more active base limit value modifiers that modify a displayed base limit value and/or one or more inactive base limit value modifiers that do not affect the base limit value. Additionally, in one or more implementations, the dynamic base limit value modification system also displays transitions of inactive base limit value modifiers to active base limit value modifiers for a user account.

Indeed, the dynamic base limit value modification system can utilize various machine learning models and a dynamic base limit value model to generate user interface elements that transparently and efficiently present determined base limit values, subsequent base limit values, and user activity conditions within a graphical user interface. For example, the dynamic base limit value modification system can select an activity machine learning model from multiple activity machine learning models utilizing a user activity duration corresponding to a user account. In addition, the dynamic base limit value modification system can generate an activity score for the user account by utilizing the selected activity machine learning model and user activity data of the user account. Furthermore, the dynamic base limit value modification system can determine a base limit value from the activity score using a base limit value model. Moreover, the dynamic base limit value modification system can also utilize the base limit value model to determine a subsequent base limit value and user activity conditions that achieve the subsequent base limit value.

Additionally, in one or more embodiments, the dynamic base limit value modification system generates and displays user interface elements to transparently and efficiently present base limit values, subsequent base limit values, and user activity conditions. As an example, the dynamic base limit value modification system can display a graphical user interface for a software application with user account information of a particular user account. For instance, the dynamic base limit value modification system can display, within the graphical user interface, a determined base limit value, subsequent base limit value, and user activity conditions to achieve the subsequent base limit value for the user account in a single interface.

Furthermore, the dynamic base limit value modification system can determine one or more base limit value modifiers for detected digital user actions. In particular, in one or more implementations, the dynamic base limit value modification system utilizes a mapping between base limit value modifiers and predefined digital user actions. Subsequently, upon detecting a particular digital user action in relation to a user account, the dynamic base limit value modification system can identify a base limit value modifier mapped to the digital user action and apply the identified base limit value modifier to the user account.

In addition, the dynamic base limit value modification system can determine the applicability of the one or more base limit value modifiers by comparison to a total base limit value modifier threshold. In particular, in response to determining that one or more base limit value modifiers fall within the total base limit value modifier threshold, the dynamic base limit value modification system can generate an available base limit value for a user account using the one or more base limit value modifiers. In addition, the dynamic base limit value modification system can display user interface elements to indicate the one or more base limit value modifiers as active in relation to the determined base limit value. Furthermore, the dynamic base limit value modification system can display additional user interface elements to indicate inactive base limit value modifiers, that do not fall within the total base limit value modifier threshold, in relation to the determined base limit value (resulting from detected digital user actions).

Moreover, the dynamic base limit value modification system can display transitions of inactive base limit value modifiers to active base limit value modifiers for a user account. To illustrate, the dynamic base limit value modification system can identify a change in base limit value modifier settings for a user account, such as a removal of an active base limit value modifier and/or a change in the total base limit value modifier threshold. Upon detecting the change in the base limit value modifier settings, the dynamic base limit value modification system can determine whether one or more inactive base limit value modifiers are applicable within the user account.

For instance, the dynamic base limit value modification system can determine that an inactive base limit value modifier falls within the total base limit value modifier threshold (e.g., due to a removal of another base limit value modifier and/or a change in the threshold value). Upon determining the inactive base limit value modifier falls within the total base limit value modifier threshold, the dynamic base limit value modification system transitions the inactive base limit value modifier as active, updates a display of the active base limit value modifiers to include the previously inactive base limit value modifier, and also utilizes the previously inactive base limit value modifier to determine the available base limit value for the user account.

The dynamic base limit value modification system can provide numerous advantages, benefits, and practical applications relative to conventional systems. For example, unlike conventional systems that often utilize computer-based models that provide outputs in difficult to navigate GUIs, the dynamic base limit value modification system can utilize various machine learning models and base limit value models to determine and provide current and future base limit values together with information for achieving the future base limit values. In certain instances, the dynamic base limit value modification system can generate flexible user interfaces that provide transparency and insight into a combined machine learning model and base value model that utilizes various variables to determine base limit values, subsequent base limit values, and user activity conditions to achieve the subsequent base limit values. By providing such transparency, the dynamic base limit value modification system can generate increasingly robust and flexible GUIs to provide practical applications from outputs and behaviors of computer-based base limit value model.

In addition to GUI flexibility, the dynamic base limit value modification system can also generate GUIs to visualize model outputs and improve computing efficiency. In particular, by generating and displaying base limit values, subsequent base limit values, and user activity conditions to achieve subsequent base limit values, the dynamic base limit value modification system reduces the number of navigational steps required within a GUI in a limited screen space of a mobile device. Accordingly, the dynamic base limit value modification system efficiently utilizes screen space and also utilizes less computational resources due to the reduction in navigation between different user interfaces (and/or information sources) to determine or interpret the outputs of a base limit value model. Additionally, the dynamic base limit value modification system also enables a graphical user interface to display the base limit values, subsequent base limit values, and user activity conditions to achieve subsequent base limit values in different time-based segments to reduce the number of navigational steps needed to determine whether user activity conditions were fulfilled in one or more different time frames.

Furthermore, the dynamic base limit value modification system also generates flexible GUIs that dynamically present modifiers for the base limit value outputs. To illustrate, in contrast to conventional systems that often are unable to provide insight into how user digital actions may impact user account values, the dynamic base limit value modification system can intuitively display various active and/or inactive modifiers connected to digital user actions in relation to the base limit values output by computer-based models. Indeed, the dynamic base limit value modification system generates adaptable GUIs that (in real time or near-real time) track, determine, and display digital user actions and active states of base limit value modifiers in a single GUI that also displays the base limit value outputs.

In addition, the dynamic base limit value modification system also provides a practical application that enables efficient interface navigation to understand base limit value modifiers and digital user actions that impact the base limit value modifiers. For instance, unlike many conventional systems that require substantial, inefficient navigation between multiple user interfaces to modify (or understand modifications) to output values on a user account, the dynamic base limit value modification system generates a presentation of the modifiers and the active states of the modifiers within an efficient GUI with reduced user navigation.

In particular, the dynamic base limit value modification system can track and adjust the active and inactive state of the base limit value modifiers based on detected user digital actions and/or changes in base limit value modifier settings. In addition, upon determining changed states of the base limit value modifiers, the dynamic base limit value modification system can modify user interface elements in the GUI to demonstrate a transition of an inactive modifier to an active modifier, and the modifier's effect on the base limit value within a single graphical user interface without user navigation between multiple interfaces.

Additionally, the dynamic base limit value modification system can also generate, for display within the GUIs, relationships between modifiers and user digital actions. Accordingly, the dynamic base limit value modification system creates an efficient GUI that utilizes less screen space and also utilizes less computational resources due to the reduction in navigation between different user interfaces (and/or information sources) to determine or interpret the outputs of a base limit value model (as described above), determine active states of various base limit value modifiers, and determine user digital actions that result in the various base limit value modifiers.

Figure 14:
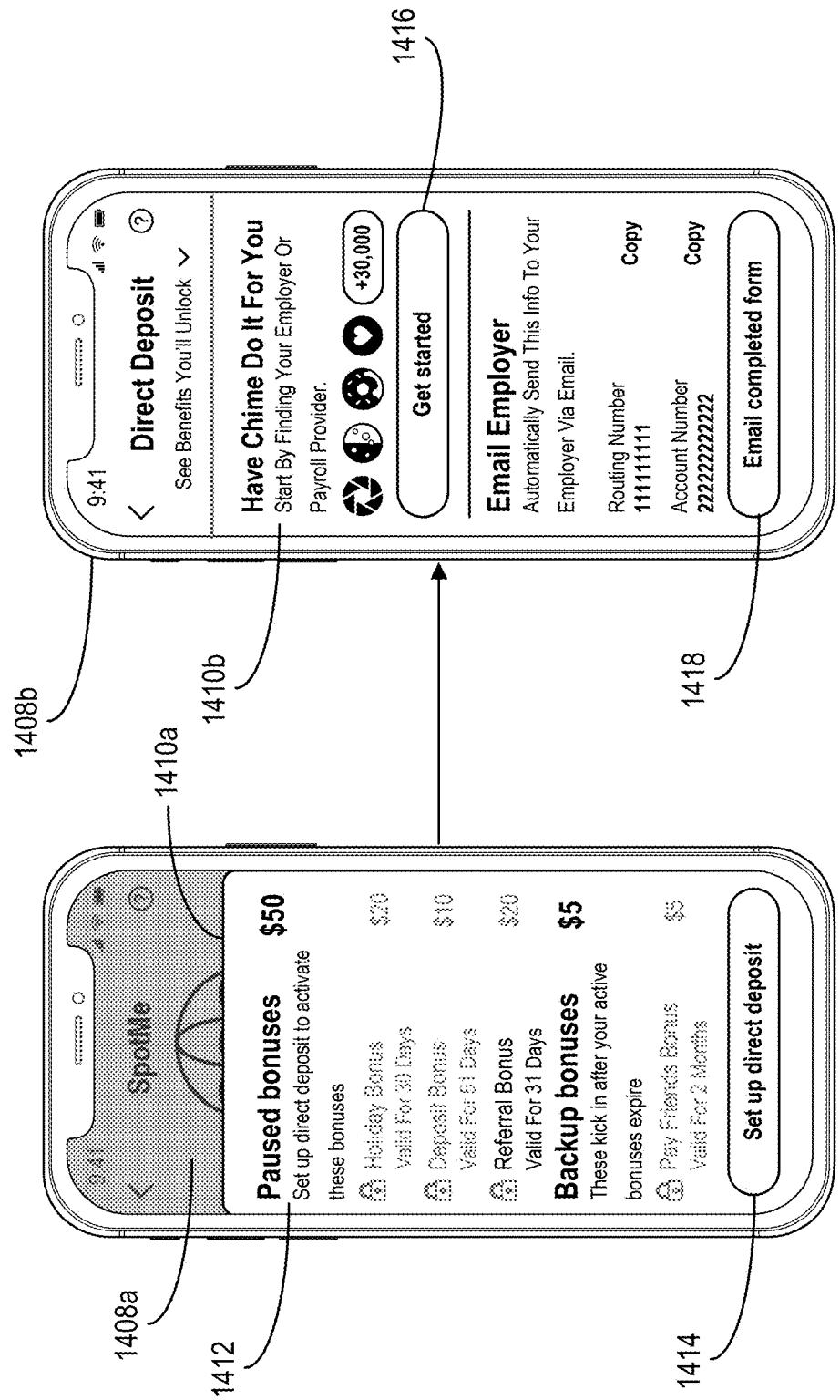
FIG. 14 illustrates a dynamic base limit value modification system displaying selectable user interface elements to initiate a digital user account action for base limit value modifiers in accordance with one or more implementations.

Moreover, in one or more cases, the dynamic base limit value modification system also generates an efficient GUI that enables performance of a digital user action to activate a base limit value modifier. For example, the dynamic base limit value modification system can, from the single GUI, provide navigation interface elements to direct a user to fulfill a digital action that activates a base limit value modifier (e.g., as shown in FIG. 14). Indeed, the dynamic base limit value modification system reduces the number of navigational steps required to fulfill the digital action and to activate the base limit value modifier directly from a GUI that presents the base limit value and modifiers for the base limit value.

Furthermore, the dynamic base limit value modification system also reduces the number of inquiries and/or electronic communications that are taken to identify information regarding a base limit value (or other output) of a base limit value model and/or base limit value modifiers from a user account. In particular, the dynamic base limit value modification system can generate GUIs (or a single GUI) that determine and display the base limit value, the user activity conditions that contribute to the determined base limit value, subsequent base limit values, base limit value modifiers, active states of the base limit value modifiers, and/or digital actions related to the base limit value modifiers. Accordingly, additional electronic communications to obtain such information is reduced. As a result, the dynamic base limit value modification system improves computational efficiency of implementing computing devices and networks by reducing the number of electronic communications and the accompanying network bandwidth.

In addition, the dynamic base limit value modification system can accurately determine account-specific values reflecting risk associated with user accounts. More specifically, the dynamic base limit value modification system utilizes multiple activity machine learning models that are specifically trained for a category of user accounts. Indeed, by utilizing and emphasizing a varying set of user activity data variables for different types of user accounts, the dynamic base limit value modification system improves the accuracy of determined metrics associated with a diverse range of user accounts.

As indicated by the foregoing discussion, the present disclosure utilizes a variety of terms to describe features and advantages of the dynamic base limit value modification system. As used herein, the term "machine learning model" refers to a computer model that can be trained (e.g., tuned or learned) based on inputs to approximate unknown functions and corresponding outputs. As an example, a machine learning model can include, but is not limited to, a neural network (e.g., a convolutional neural network, recurrent neural network, or deep learning model), a decision tree (e.g., a gradient boosted decision tree, a random forest decision tree, a decision tree with variable or output probabilities), and/or a support vector machine.

Furthermore, as used herein, the term "activity machine learning model" refers to a machine learning model that can be trained to predict (or determine) an activity score for a user. In particular, an activity machine learning model can analyze input user account activity data corresponding to a user account to generate (or predict) an activity score for the user account. In some embodiments, the activity machine learning model includes a decision tree that generate probabilities for activity scores from various variables corresponding to various characteristics from user account activity data. Indeed, in one or more embodiments, the dynamic base limit value modification system utilizes the probabilities corresponding to the various activity scores to select (or determine) an activity score for the user account. Additionally, in one or more embodiments, the dynamic base limit value modification system can train multiple activity machine learning models to specifically generate activity scores for a category of user accounts (e.g., based on account activity duration).

As used herein, the term "activity score" refers to a value indicating a rating for a user account. In some embodiments, the activity score indicates a risk level corresponding to a user account. For example, the dynamic base limit value modification system can utilize the activity score of a user account generated from an activity machine learning model to determine a base limit value utilization risk level for the user account. Indeed, the activity score of a user account can indicate the likelihood of a user account failing to pay a base limit value amount utilized by the user account. In some instances, the dynamic base limit value modification system can utilize an activity score to determine a risk segment of a user account.

As used herein, the term "user activity data" refers to information (or data) associated with interactions of a user with the dynamic base limit value modification system (or a corresponding client device application). For example, user activity data can include actions, durations corresponding to actions, frequencies of actions, account values, and/or other representations of interactions of a user corresponding to a user account on a client application (e.g., operating a client application as shown in FIG. 1). To illustrate, user activity data can include, but is not limited to, historical utilization of an application, a duration of satisfying a threshold account value (e.g., an amount of time that a user account satisfies a threshold account value within the user account), historical transaction activity within the user account, historical base limit value utilization, base limit value payoff times for the user account, historical flagged activities for the user account, and/or a number of declined transactions corresponding to the user account.

Furthermore, as used herein, the term "user digital action" refers to an electronic activity or digital change within a user account or within one or more systems in relation to the user account in reaction to a digital user interaction of a user corresponding to the user account via a client application and/or a third party system. For example, a user digital action can include one or more digital network transactions in relation to the user account, a deposit and/or withdrawal transaction in relation to the user account, configuration of an automatic digital network transaction (e.g., direct deposit settings, auto payment settings) in relation to the user account. As another example, a user digital action can include user interactions to initiate or create accounts and/or account types (e.g., opening a savings account, opening a credit card account), initiate and/or completing various user communications with one or more other user accounts (e.g., a network transaction with another user account, sending a user account referral link). In some cases, the dynamic base limit value modification system detects various user digital actions from various user activity data (as described above).

As used herein, the term "base limit value" refers to a numerical value that represents an excess utilization buffer for a user account. In particular, the base limit value can include a numerical value that represents an amount that a user account is permitted to obtain or transact in excess of an amount belonging to the user account. As an example, a base limit value can include a monetary overdraft amount or a line of credit. In addition, as used herein, the term "available base limit value" refers to a base limit value that is accessible for a user account. In particular, the available base limit value can include the base limit value and/or a modified base limit value determined from the base limit value and one or more base limit value modifiers.

As further used herein, the term "base limit value modifier" refers to a numerical value that changes a base limit value. In particular, a base limit value modifier can include a numerical value that is added, subtracted, multiplied, and/or divided with a base limit value to generate a modified base limit value (or an available base limit value). In some cases, a base limit value modifier can include a numerical value that supplements (e.g., as a bonus or boost) a base limit value output from one or more computer-based models (in accordance with one or more implementations herein). In one or more instances, the dynamic base limit value modification system applies base limit value modifiers connected to digital user actions based on mappings between the base limit value modifiers and various digital user actions.

Furthermore, as used herein, the term "total base limit value modifier threshold" refers to a numerical value representing a boundary for an available number of base limit value modifiers for a user account. In particular, a total base limit value modifier threshold can include an upper boundary of base limit value modifiers accessible in combination for a user account. To illustrate, in some cases, the dynamic base limit value modification system utilizes one or more base limit value modifiers for a user account, as active modifiers, when the summation of the one or more base limit value modifiers is less than and/or equal to (e.g., falls within)

the total base limit value modifier threshold. In addition, the dynamic base limit value modification system can forgo the utilization of a base limit value modifier (e.g., set as inactive) when the base limit value modifier combined with the one or more active base limit value modifiers is greater than (e.g., does not fall within) the total base limit value modifier threshold.

As used herein, the term "user activity condition" refers to a benchmark action from a user account that causes a change in a base limit value corresponding to the user account. In particular, the user activity condition can include a conditional action that upon performance from a user account results in a change (or assignment) of a base limit value for the user account. As an example, the user activity condition can include a deposit transaction activity (e.g., a user account transaction that adds a monetary value within the user account), a deposit transaction amount, a frequency of a deposit transaction, and/or a user-to-user transaction activity. In some embodiments, the user activity condition can include a user activity condition tier that indicates a range or level of user activity corresponding to the user account. For instance, the user activity condition tier can include a deposit transaction activity tier that indicates a range of deposit transaction amounts corresponding to a user account (e.g., $0 to $300, $301 to $700, $1801 to $2900 in deposit transaction amounts).

As used herein, the term "base limit value model" refers to a model that determines (and/or outputs) a base limit value for a user account from an activity score and/or user activity data. For example, a base limit value model can include a mapping of information between user activity scores, user activity conditions, and base limit values. In some embodiments, the base limit value model includes a machine learning model and/or a model (or representation) generated through a machine learning model that maps user activity scores, user activity conditions, and base limit values to output base limit values based on input activity scores and/or other user activity data.

In some instances, a base limit value model includes a base limit value matrix. For example, a base limit value matrix can include activity scores and user activity conditions that intersect to reference base limit values. In addition, a base limit value model can include a base limit value tiered data table. For instance, a base limit value tiered data table can include base limit values and a set of user activity conditions that achieve subsequent base limit values in the tiered data table.

Turning now to the figures, FIG. 1 illustrates a block diagram of a system 100 (or system environment) for implementing an inter-network facilitation system 104 and a dynamic base limit value modification system 106 in accordance with one or more embodiments. As shown in FIG. 1, the system 100 includes server device(s) 102 (which includes an inter-network facilitation system 104 and the dynamic base limit value modification system 106), client device 110, and a network 108. As further illustrated in FIG. 1, the server device(s) 102 and the client device 110 can communicate via the network 108.

Although FIG. 1 illustrates the dynamic base limit value modification system 106 being implemented by a particular component and/or device within the system 100, the dynamic base limit value modification system 106 can be implemented, in whole or in part, by other computing devices and/or components in the system 100 (e.g., the client device 110). Additional description regarding the illustrated computing devices (e.g., the server device(s) 102, the client device 110, and/or the network 108) is provided with respect to FIGS. 16 and 17 below.

As shown in FIG. 1, the server device(s) 102 can include the inter-network facilitation system 104. In some embodiments, the inter-network facilitation system 104 can determine, store, generate, and/or display financial information corresponding to a user account (e.g., a banking application, a money transfer application). Furthermore, the inter-network facilitation system 104 can also electronically communicate (or facilitate) financial transactions between one or more user accounts (and/or computing devices). Moreover, the inter-network facilitation system 104 can also track and/or monitor financial transactions and/or financial transaction behaviors of a user within a user account.

Indeed, the inter-network facilitation system 104 can include a system that includes the dynamic base limit value modification system and that facilitates financial transactions and digital communications across different computing systems over one or more networks. For example, an inter-network facilitation system manages credit accounts, secured accounts, and other accounts for a single account registered within the inter-network facilitation system. In some cases, the inter-network facilitation system is a centralized network system that facilitates access to online banking accounts, credit accounts, and other accounts within a central network location. Indeed, the inter-network facilitation system can link accounts from different network-based financial institutions to provide information regarding, and management tools for, the different accounts.

Furthermore, in accordance with one or more implementations described herein, the dynamic base limit value modification system 106 can generate and display one or more base limit value modifiers for digital user account actions to actively and/or inactively affect a determined base limit value for a user account. For example, the dynamic base limit value modification system 106 can utilize a variety of machine learning models and a base limit value model to generate user interface elements that display current and subsequent base limit values for user accounts. Additionally, the dynamic base limit value modification system 106 can determine and display user interface elements indicating one or more active base limit value modifiers that modify a displayed base limit value and/or one or more inactive base limit value modifiers that do not affect the base limit value. In addition, the dynamic base limit value modification system 106 can also display transitions of inactive base limit value modifiers to active base limit value modifiers for a user account.

As also illustrated in FIG. 1, the system 100 includes the client device 110. For example, the client device 110 may include, but is not limited to, a mobile device (e.g., smartphone, tablet) or other type of computing device, including those explained below with reference to FIG. 16. Additionally, the client device 110 can include a computing device associated with (and/or operated by) user accounts for the inter-network facilitation system 104. Moreover, although FIG. 1 illustrates a single client device (e.g., client device 110), the system 100 can include various numbers of client devices that communicate and/or interact with the inter-network facilitation system 104 and/or the dynamic base limit value modification system 106.

Furthermore, as shown in FIG. 1, the client device 110 includes a client application 112. The client application 112 can include instructions that (upon execution) cause the client device 110 to perform various actions. For example, as shown in FIG. 1, a user of a user account can interact with the client application 112 on the client device 110 to access financial information, initiate a financial transaction, and/or select, utilize, and/or view a base limit value and/or base limit value modifiers displayed within the client application 112. In addition, the client application 112 can provide user data activity and/or digital user actions to the dynamic base limit value modification system 106 (via the server device(s) 102) to generate activity scores and/or base limit values for a user account.

In certain instances, the client device 110 corresponds to one or more user accounts (e.g., user accounts stored at the server device(s) 102). For instance, a user of a client device can establish a user account with login credentials and various information corresponding to the user. In addition, the user accounts can include a variety of information regarding financial information and/or financial transaction information for users (e.g., name, telephone number, address, bank account number, credit amount, debt amount, financial asset amount), payment information, transaction history information, and/or contacts for financial transactions. In some embodiments, a user account can be accessed via multiple devices (e.g., multiple client devices) when authorized and authenticated to access the user account within the multiple devices.

The present disclosure utilizes client devices to refer to devices associated with such user accounts. In referring to a client (or user) device, the disclosure and the claims are not limited to communications with a specific device, but any device corresponding to a user account of a particular user. Accordingly, in using the term client device, this disclosure can refer to any computing device corresponding to a user account of an inter-network facilitation system.

As further shown in FIG. 1, the system 100 includes the network 108. As mentioned above, the network 108 can enable communication between components of the system 100. In one or more embodiments, the network 108 may include a suitable network and may communicate using a various number of communication platforms and technologies suitable for transmitting data and/or communication signals, examples of which are described with reference to FIG. 16. Furthermore, although FIG. 1 illustrates the server device(s) 102 and the client device 110 communicating via the network 108, the various components of the system 100 can communicate and/or interact via other methods (e.g., the server device(s) 102 and the client device 110 can communicate directly).

Figure 2A:
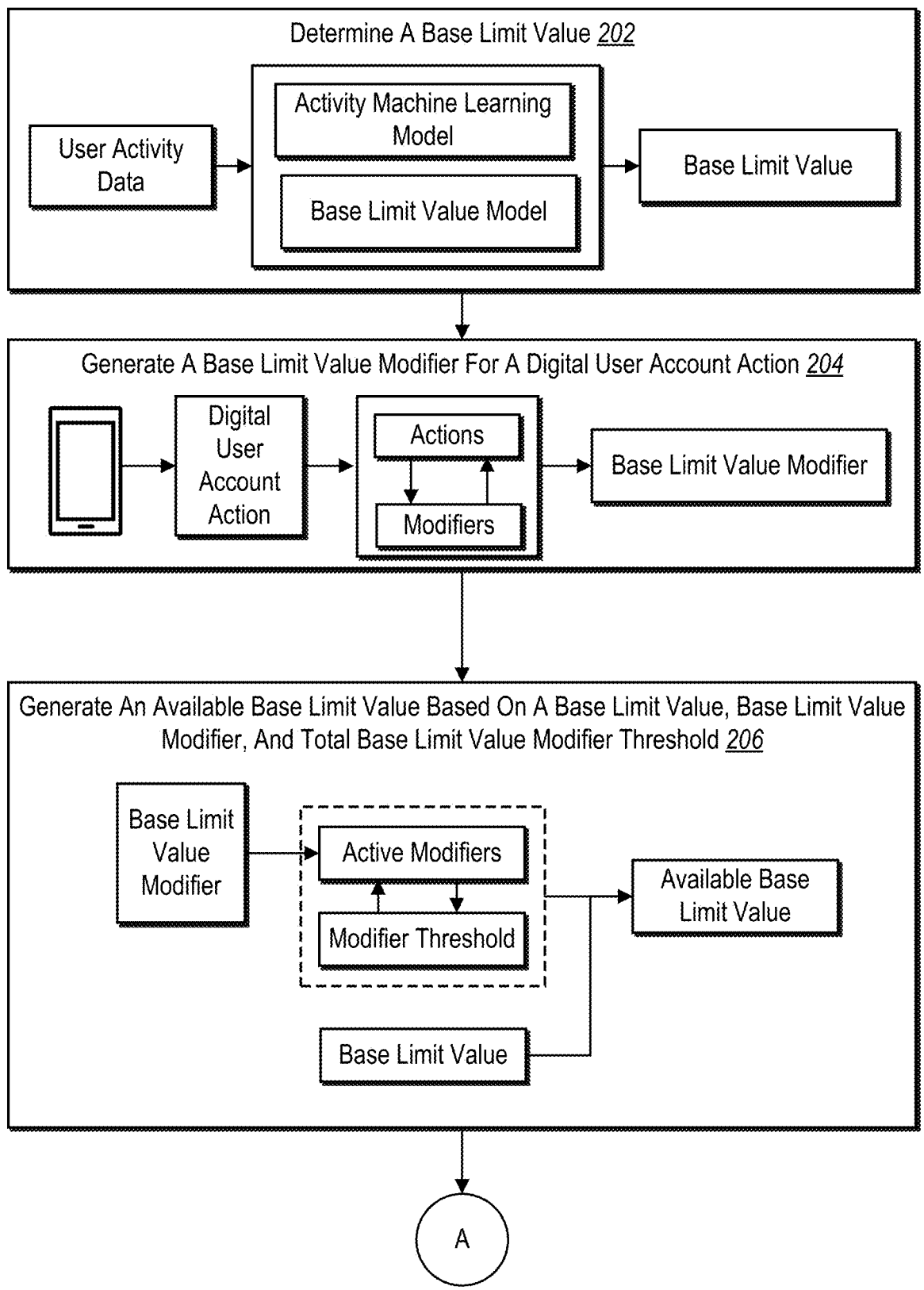

As mentioned above, the dynamic base limit value modification system 106 generates and displays one or more base limit value modifiers for digital user account actions to actively and/or inactively affect a determined base limit value for a user account. For example, FIGS. 2A and 2B illustrate an overview of the dynamic base limit value modification system 106 generating and displaying base limit value modifiers for a user account. More specifically, FIGS. 2A and 2B illustrate an overview of the dynamic base limit value modification system 106 determining a base limit value, generating a base limit value modifier for a digital user account action, and generating an available base limit value based on the base limit value, the base limit value modifier, and a total base limit value modifier threshold. Additionally, FIGS. 2A and 2B also illustrate the dynamic base limit value modification system 106 displaying graphical user interface element for the available base limit value and the base limit value modifier and, in addition, displaying graphical user interface elements for the available base limit value and active and inactive base limit value modifiers.

As shown in act 202 of FIG. 2A, the dynamic base limit value modification system 106 determines a base limit value. For example, as shown in the act 202 of FIG. 2A, the dynamic base limit value modification system 106 utilizes an activity machine learning model and a base limit value model to determine a base limit value for a user account from user activity data. In some cases, the dynamic base limit value modification system 106 also determines a subsequent base limit value and user activity conditions for the subsequent base limit value from the base limit value model. Indeed, the dynamic base limit value modification system 106 generating an activity score from an activity machine learning model and/or utilizing a base limit value model to determine base limit values (and/or subsequent base limit values) is described in greater detail below (e.g., in relation to FIGS. 3-6).

Furthermore, as shown in act 204 of FIG. 2A, the dynamic base limit value modification system 106 generates a base limit value modifier for a digital user action. As shown in the act 204 of FIG. 2A, the dynamic base limit value modification system 106 can detect a digital user account action. Moreover, as shown in the act 204, the dynamic base limit value modification system 106 can generate a base limit value modifier for the digital user account action utilizing mappings between digital actions and base value limit modifiers. Indeed, the dynamic base limit value modification system 106 generating a base limit value modifier for a user account is described in greater detail below (e.g., in relation to FIGS. 7 and 8).

In addition, as shown in act 206 of FIG. 2A, the dynamic base limit value modification system 106 generates an available base limit value based on the base limit value, base limit value modifier, and a total base limit value modifier threshold. To illustrate, as shown in the act 206 of FIG. 2A, the dynamic base limit value modification system 106 sets the generated base limit value modifier as part of active base limit value modifiers (e.g., active modifiers) and compares the active base limit value modifiers to a total base limit value modifier threshold (e.g., the modifier threshold). Upon determining that the active base limit value modifiers (which includes the generated base limit value modifier) falls within the total base limit value modifier threshold, the dynamic base limit value modification system 106 determines an available base limit value using the base limit value and the active base limit value modifiers. Indeed, the dynamic base limit value modification system 106 generating an available base limit value based on the base limit value, base limit value modifier, and a total base limit value modifier threshold is described in greater detail below (e.g., in relation to FIG. 9).

Moreover, as shown in act 208 of FIG. 2B, the dynamic base limit value modification system 106 displays graphical user interface elements for the available base limit value and the base limit value modifier. As illustrated in the act 208 of FIG. 2B, the dynamic base limit value modification system 106 utilizes the available base limit value (e.g., as shown in the act 206) and one or more base limit value modifiers to display graphical user interface elements for the available base limit value and the one or more base limit value modifiers. Indeed, the dynamic base limit value modification system 106 displaying one or more user interface elements for the available base limit value and the base limit value modifier is described in greater detail below (e.g., in relation to FIGS. 10-13).

Furthermore, in some cases, as shown in act 210 of FIG. 2B, the dynamic base limit value modification system 106 also displays graphical user interface elements for the available base limit value and active and/or inactive base limit value modifiers. In some instances, as shown in the act 210 of FIG. 2B, the dynamic base limit value modification system 106 determines an additional base limit value modifier with one or more active base limit value modifiers does not fall within the total base limit value modifier threshold. Moreover, as shown in the act 210, the dynamic base limit value modification system 106 displays the one or more active base limit value modifiers (with the available base limit value) and the additional base limit value modifier as inactive (e.g., due to not falling within the total base limit value modifier threshold). Indeed, the dynamic base limit value modification system 106 displaying graphical user interface elements for the available base limit value and active and/or inactive base limit value modifiers is described in greater detail below (e.g., in relation to FIGS. 10-13).

Figure 3:
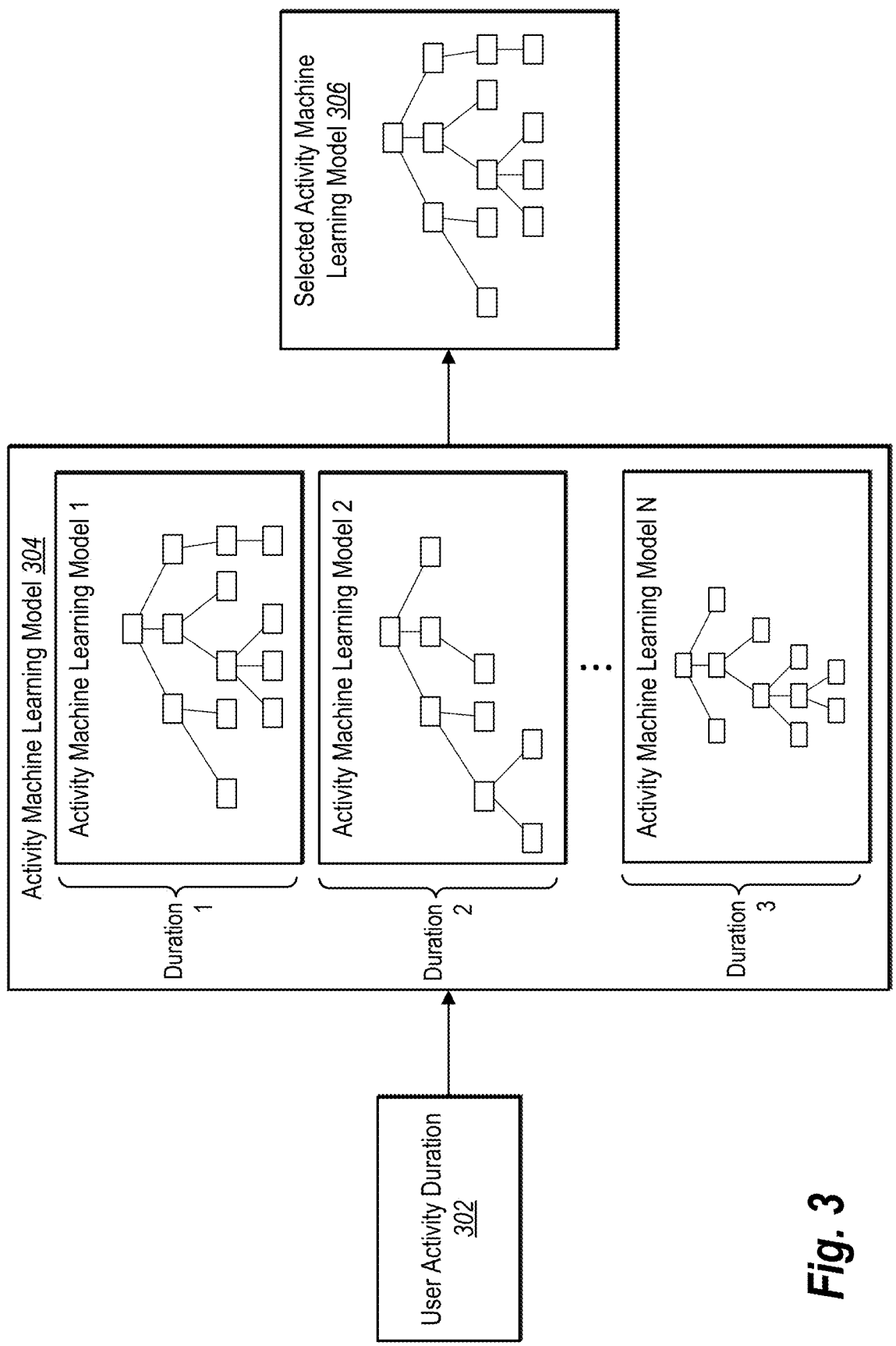
FIG. 3 illustrates a dynamic base limit value modification system selecting an activity machine learning model in accordance with one or more implementations.

As previously mentioned, the dynamic base limit value modification system 106 can select an activity machine learning model for a user account based on characteristics of the user account. For example, FIG. 3 illustrates the dynamic base limit value modification system 106 selecting between activity machine learning models. In particular, FIG. 3 illustrates the dynamic base limit value modification system 106 utilizing a user activity duration to select an activity machine learning model from between multiple activity machine learning models.

As shown in FIG. 3, the dynamic base limit value modification system 106 identifies a user activity duration 302 for a user account. In some instances, the user activity duration can include a time or duration that the user account has been active (e.g., from a creation of the user account, from an active status of a user account). In one or more embodiments, the dynamic base limit value modification system 106 utilizes the user activity duration to indicate an age (or tenure) of a user account. As an example, a user activity duration can include a user account age such as, but not limited to, 3 weeks from account creation, 2 months from account creation, and/or 2 years from account creation.

As further shown in FIG. 3, the dynamic base limit value modification system 106 identifies multiple activity machine learning models 304. Furthermore, FIG. 3 illustrates the multiple activity machine learning models corresponding to various user activity durations ranges (e.g., a range of time). In one or more embodiments, the dynamic base limit value modification system 106 compares the user activity duration 302 to the user activity duration ranges corresponding to the multiple activity machine learning models 304 to select an activity machine learning model 306.

For example, the dynamic base limit value modification system 106 can determine that the user activity duration 302 satisfies a particular user activity duration range corresponding to an activity machine learning model from the multiple activity machine learning models 304. Subsequently, the dynamic base limit value modification system 106 can select the activity machine learning model that corresponds to the particular user activity duration range as the activity machine learning model for the user account.

Although one or more embodiments describe the dynamic base limit value modification system 106 utilizing a user activity duration to select the activity machine learning model, the dynamic base limit value modification system 106 can utilize various types of user account data (or characteristics) to select an activity machine learning model. For example, the dynamic base limit value modification system 106 can utilize an activity (or usage) time corresponding to a user account (e.g., the amount of time that a user account is actively online within a client application of the inter-network facilitation system), an account value, an amount of time with a threshold amount of direct deposit value, a number of financial account types, types of financial accounts, and/or other user account characteristics (user age, user authentication security settings, geographic location). Furthermore, although one or more embodiments associates activity machine learning models with user activity duration ranges, the dynamic base limit value modification system 106 can associate the activity machine learning models to various types of user account data (or characteristics) with various types of categorical references (e.g., a list or mapping of types, a specific value, a threshold).

Indeed, in one or more embodiments, the dynamic base limit value modification system 106 trains each activity machine learning model from the multiple activity machine learning models for a specific set of user accounts (e.g., based on the categorization with the user account data or characteristics such as user activity duration). As an example, the dynamic base limit value modification system 106 trains an activity machine learning model to generate an accuracy score for a user account that corresponds to a user activity duration associated with the activity machine learning model. By training the activity machine learning model for user accounts within a user activity duration range, the dynamic base limit value modification system 106 generates and selects activity machine learning models that are accurate for a specific grouping of user accounts and the resulting activity scores are more accurate indicators of risk for the specific grouping of user accounts.

As an example, the dynamic base limit value modification system 106 can train a first activity machine learning model to generate activity scores for user accounts utilizing a first set of user activity data. Moreover, the dynamic base limit value modification system 106 can train a second activity machine learning model to generate activity scores for user accounts utilizing a second set of user activity data. Indeed, the first set of user activity data can include a combination of user activity data variables that are different from the second set of user activity data. By doing so, the dynamic base limit value modification system 106 can train activity machine learning models to emphasize user activity data that more effectively determines a risk (or other metric) of user accounts belonging to a group of user accounts in a particular grouping (e.g., based on user activity duration).

In one or more embodiments, the dynamic base limit value modification system 106 trains an activity machine learning model utilizing historical user activity data from user accounts. In particular, the dynamic base limit value modification system 106 utilizes historical user activity data from a user account to select an activity machine learning model and generate a predicted activity score for the user account. Then, the dynamic base limit value modification system 106 can determine a loss function by comparing the predicted activity score to historical behaviors of the user account (as ground truth data). For example, the dynamic base limit value modification system 106 can identify the number of times that the user account has paid back a utilized base limit value and/or the number of unpaid utilized base limit values as ground truth data. Then, the dynamic base limit value modification system 106 can compare the ground truth data to the generated activity score to calculate a loss that indicates the accuracy of the activity score for the particular user. For example, the dynamic base limit value modification system 106 can utilize a loss function such as, but not limited to, an L1 loss, L2 loss, mean square error, classification loss, and/or cross entropy loss.

In some embodiments, the dynamic base limit value modification system 106 utilizes third party metric information of user accounts to generate a loss (or determine an accuracy) for a generated activity score from an activity machine learning model. For example, the dynamic base limit value modification system 106 can receive (or identify) a fraud (or risk) score for a user account from a third party source as the metric information of the user account. Indeed, a fraud (or risk) score can indicate whether a user account is associated with fraudulent activity and/or negative credit reports. Then, the dynamic base limit value modification system 106 can compare the fraud (or risk) score to the activity score generated by the activity machine learning model to determine an accuracy of the activity machine learning model (e.g., a loss function).

Furthermore, the dynamic base limit value modification system 106 can utilize a loss value determined from a predicted (or generated) activity score of a user account to train an activity machine learning model. In particular, in one or more embodiments, the dynamic base limit value modification system 106 trains an activity machine learning model based on a loss value by adjusting or learning parameters of the activity machine learning model (e.g., back propagation), adjusting weights provided to various user activity data variables, and/or modifying the user activity data variables utilized for the activity machine learning model. In some embodiments, the dynamic base limit value modification system 106 adjusts (or modifies) the risk values (or scores) associated with various nodes in an activity score decision tree model based on the loss values.

Figure 4:
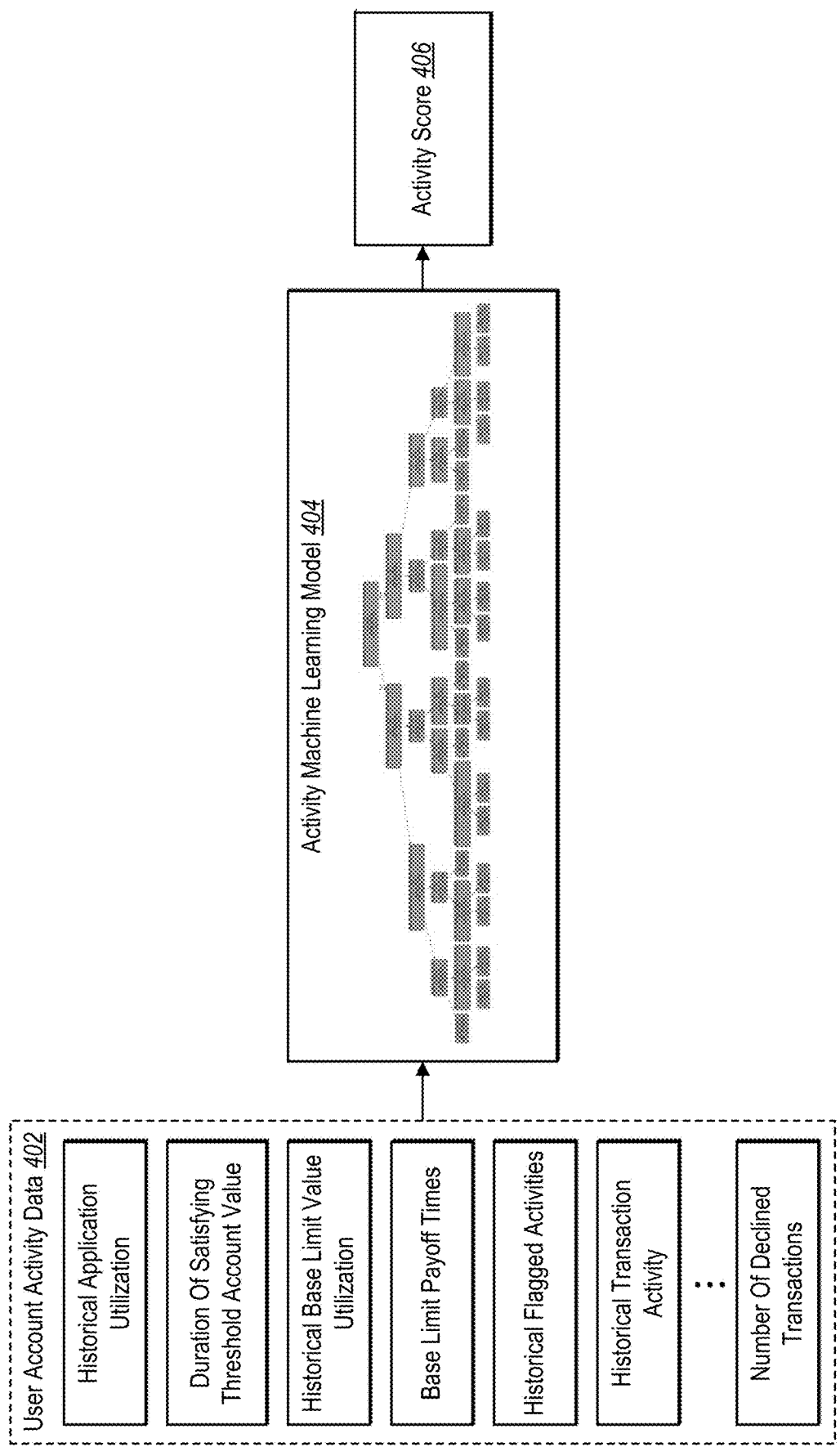
FIG. 4 illustrates a dynamic base limit value modification system generating an activity score utilizing an activity machine learning model in accordance with one or more implementations.

As mentioned above, the dynamic base limit value modification system 106 can generate an activity score for a user account utilizing an activity machine learning model. For example, FIG. 4 illustrates the dynamic base limit value modification system 106 generating an activity score utilizing an activity machine learning model with user account activity data of a user account. As shown in FIG. 4, the dynamic base limit value modification system 106 utilizes user account activity data 402 with a selected activity machine learning model 404 to generate an activity score. In particular, as shown in FIG. 4, the dynamic base limit value modification system 106 utilizes the variables from the user account activity data 402 with a decision tree model of the activity machine learning model 404 to determine an activity score (e.g., the activity score 406) that accurately corresponds to the combination of variable information for the user account activity data 402.

As illustrated in FIG. 4, the dynamic base limit value modification system 106 can utilize various types of variables for the user account activity data 402. For instance, as shown in FIG. 4, the user account activity data 402 can include historical application utilization, a duration of satisfying a threshold account value, historical base limit value utilization, base limit payoff times, historical flagged activities, historical transaction activities, and/or a number of declined transactions. As an example, the dynamic base limit value modification system 106 can utilize historical application utilization data that indicate historical actions of a user account. For example, the historical application utilization data can include, but is not limited to, a number of application logins, application features utilized by a user of a user account, and/or a frequency corresponding to the utilized features.

In addition, the dynamic base limit value modification system 106 can utilize a duration of satisfying a threshold account value from a user account. In particular, the duration of satisfying a threshold account value can include an amount of time (e.g., days, months, and/or years) that a user account has maintained an account value (e.g., an account balance) that is equal to or above a particular threshold account value. In addition, the dynamic base limit value modification system 106 can utilize a historical base limit value utilization. In one or more embodiments, the dynamic base limit value modification system 106 can utilize the historical base limit value utilization to indicate the amount, frequency, and times (e.g., dates, times of day) that a user account has utilized a provided base limit value. Additionally, the dynamic base limit value modification system 106 can utilize base limit payoff times from a user account that indicates times (e.g., dates, times of day) of transactions that pay a utilized base limit value amount within a user account.

Furthermore, the dynamic base limit value modification system 106 can utilize historical flagged activities as user account activity data for an activity machine learning model. As an example, a historical flagged activity can include flags (or notes) corresponding to a user account that indicates various identified activities of the user account such as, but not limited to, a flag indicating fraudulent activity, a flag indicating historical bans and/or blacklists of a user account, and/or previous penalties associated with a user account. In addition, the historical flagged activities can include third party reports on a user account that identifies (or indicates) fraudulent, malicious, and/or other security related activities or actions taken by a user of the user account.

Additionally, the dynamic base limit value modification system 106 can also utilize historical transaction activities as user account activity data. In some embodiments, the dynamic base limit value modification system 106 identifies previous transactions with merchants, services, persons, and/or other users of the inter-network facilitation system as historical transaction activities. In certain instances, the dynamic base limit value modification system 106 utilizes a transaction type (e.g., utilities, shopping, travel, fitness) associated with the transaction as part of the historical transaction activity. In some cases, the dynamic base limit value modification system 106 utilizes various combinations of at least the timing corresponding to the historical transaction activity (e.g., dates, time of days, time), the recipient or sender of the transactions, and/or transaction amounts as part of historical transaction activities. In addition, the dynamic base limit value modification system 106 can also utilize a number of declined transactions as user account activity data. For example, the dynamic base limit value modification system 106 a number of declined transactions to indicate a number of times a user account has had a declined transaction (e.g., due to insufficient funds, fraud alerts).

Although one or more embodiments describe the dynamic base limit value modification system 106 utilizing particular types of user account activity data, the dynamic base limit value modification system 106 can utilize various user account activity data variables within an activity machine learning model to generate an activity score. In particular, the dynamic base limit value modification system 106 can utilize numerous variables (e.g., hundreds, thousands) corresponding to various categories such as, but not limited to, activity logs of a user account sessions, user account balances, user account transactions, user account income and/or occupation information, geographic location information, financial products (e.g., credit cards, loans) associated with the user account, contact information associated with a user account (e.g., phone numbers, email addresses), user account spending, and/or transaction behaviors.

As mentioned above, the dynamic base limit value modification system 106 can train multiple activity machine learning models to accurately generate activity scores for a specific category of user accounts. Indeed, the dynamic base limit value modification system 106 can train an activity machine learning model to emphasize (or function) for a specific set of user account activity data variables. In particular, the dynamic base limit value modification system 106 can determine a set of user account activity data variables to utilize for a particular activity machine learning model (e.g., based on a duration of activity from a user account or other characteristic of a user account). In some cases, the dynamic base limit value modification system 106 can provide (or assign) weights to particular user account activity data variables based on the duration of activity from a user account or other characteristic of a user account (e.g., for the selected activity machine learning model).

As shown in FIG. 4, the dynamic base limit value modification system 106 utilizes an activity score decision tree as the activity machine learning model. In one or more embodiments, the dynamic base limit value modification system 106 utilizes an activity machine learning model comprising an activity score decision tree that includes various user account activity data variables that branch based on the user account activity data satisfying (or not satisfying) the thresholds generated for the various user account activity data variables. Then, based on satisfying (or not satisfying) the thresholds corresponding to the user account activity data variables, the dynamic base limit value modification system 106 can determine the effect the branching user account activity data variables contributes to a risk score (or value) of a user account (e.g., in terms of a risk percentage).

To illustrate, the dynamic base limit value modification system 106 can utilize an activity score decision tree to determine whether data of a user account (e.g., activity data) satisfies a threshold for a first node of the decision tree. Based on whether the user account satisfies the threshold for the first node, the dynamic base limit value modification system 106 can track a risk score for the user account and further traverse to subsequent nodes to check other user activity data variables. Indeed, at each node of the decision tree, the dynamic base limit value modification system 106 can adjust the risk score of the user account based on whether the user account activity data satisfies the thresholds for the user activity data variable at the particular node.

As an example, at a first node of the decision tree, the dynamic base limit value modification system 106 can identify whether an account balance of a user account has been above a threshold balance amount for a threshold number of days. In some instances, upon determining that the account balance of the user account does satisfy the threshold balance amount and the threshold number of days, the dynamic base limit value modification system 106 can subsequently traverse to a node of the activity score decision tree that does not increase the risk score of the user account. On the other hand, upon determining that the account balance of the user account does not satisfy the threshold balance for the threshold number of days, the dynamic base limit value modification system 106 can subsequently traverse to a node of the activity score decision tree that increases the risk score of the user account. In addition, the dynamic base limit value modification system 106 can further analyze another user activity data variable at the subsequent nodes to further determine increases (and/or decreases) in a risk score for the user account.

In one or more embodiments, the dynamic base limit value modification system 106 outputs an activity score that indicates a numerical value within a predetermined range based on the risk score (or another value) of the decision tree of the activity machine learning model. For instance, the dynamic base limit value modification system 106 can utilize an activity score value between zero and six. In particular, the dynamic base limit value modification system 106 can utilize the activity score value of zero to six to indicate varying risk levels corresponding to the user account (e.g., via a risk score from the activity score decision tree). For instance, an activity score of zero can be associated with a high risk level (e.g., a high risk percentage) and an activity score of six can be associated with a low risk level (or vice versa). Indeed, the activity score can indicate a risk level of a user account failing to repay a utilized base limit value (or failing to reinstate an account balance amount that satisfies the base limit value).

In some embodiments, the activity score can be various numerical values (e.g., zero to nine) and/or other types of data to indicate a category (or magnitude) of risk of a user account. For example, the activity score can include an alphabetical grade, a percentage, class, and/or a label. In addition, although one or more embodiments describe the dynamic base limit value modification system 106 generating an activity score from a risk value determined within a decision tree of the activity machine learning model, the dynamic base limit value modification system 106 can utilize the decision tree of the activity machine learning model to generate various metrics. For instance, the dynamic base limit value modification system 106 can utilize the activity machine learning model to generate metrics such as, but not limited to, an interest (or satisfaction) value of a user account, a conversion probability for the user account, a loyalty of the user account, a user activity condition tier for the user account, and/or a risk segment for the user account.

For instance, although one or more embodiments describe the dynamic base limit value modification system 106 utilizing machine learning models to generate (or predict) an activity score for a user account, the dynamic base limit value modification system 106 can also utilize machine learning models to determine user activity condition tiers (e.g., a deposit transaction activity tier) for the user account as a metric. To illustrate, the dynamic base limit value modification system 106 can utilize user account activity data with an activity machine learning model to determine a user activity condition tier for a user account. In some cases, the user activity condition tier includes a deposit transaction activity tier for a user account that associates the user account with a range of deposit transaction activity amounts (e.g., $0 to $300, $301 to $700, $701 to $1200). In one or more embodiments, the dynamic base limit value modification system 106 utilizes a determined user activity condition tier for a user account to determine an activity score (e.g., determining a higher activity score as a user accounts user activity condition tier rises).

Furthermore, although one or more embodiments describe the dynamic base limit value modification system 106 utilizing machine learning models to generate (or predict) an activity score for a user account, in some implementations, the dynamic base limit value modification system 106 can also utilize machine learning models to determine risk segments for the user account as a metric. In particular, the dynamic base limit value modification system 106 can utilize user account activity data with an activity machine learning model to determine a risk segment for a user account. Indeed, in some instances, the risk segment indicates a categorized likelihood of a user account failing to pay a base limit value amount utilized by the user account (i.e., risk level). For instance, the dynamic base limit value modification system 106 can utilize the user account activity data with an activity machine learning model to determine risk segments, such as, but not limited to, low risk, medium risk, and/or high risk for a user account. In some implementations, the dynamic base limit value modification system 106 utilizes a determined activity score (from the activity machine learning model) for a user account to determine a risk segment for the user account (e.g., determining a lower risk segment as the activity score for the user account increases).

In addition, although one or more embodiments describe the dynamic base limit value modification system 106 utilizing an activity score decision tree model, the dynamic base limit value modification system 106 can utilize various machine learning models to generate (or predict) an activity score for a user account. For example, the dynamic base limit value modification system 106 can utilize a classification neural network to classify a user account into an activity score (or activity score grouping) based on one or more user activity data variables. In some instances, the dynamic base limit value modification system 106 can utilize a regression-based and/or clustering-based machine learning models to determine an activity score for a user account based on one or more user activity data variables.

Moreover, in one or more embodiments, the dynamic base limit value modification system 106 can determine activity scores using activity machine learning models as described in U.S. application Ser. No. 17/519,129 filed Nov. 4, 2021, entitled GENERATING USER INTERFACES COMPRISING DYNAMIC BASE LIMIT VALUE USER INTERFACE ELEMENTS DETERMINED FROM A BASE LIMIT VALUE MODEL (hereinafter "application Ser. No. 17/519,129"), the contents of which are herein incorporated by reference in their entirety.

Figure 5:
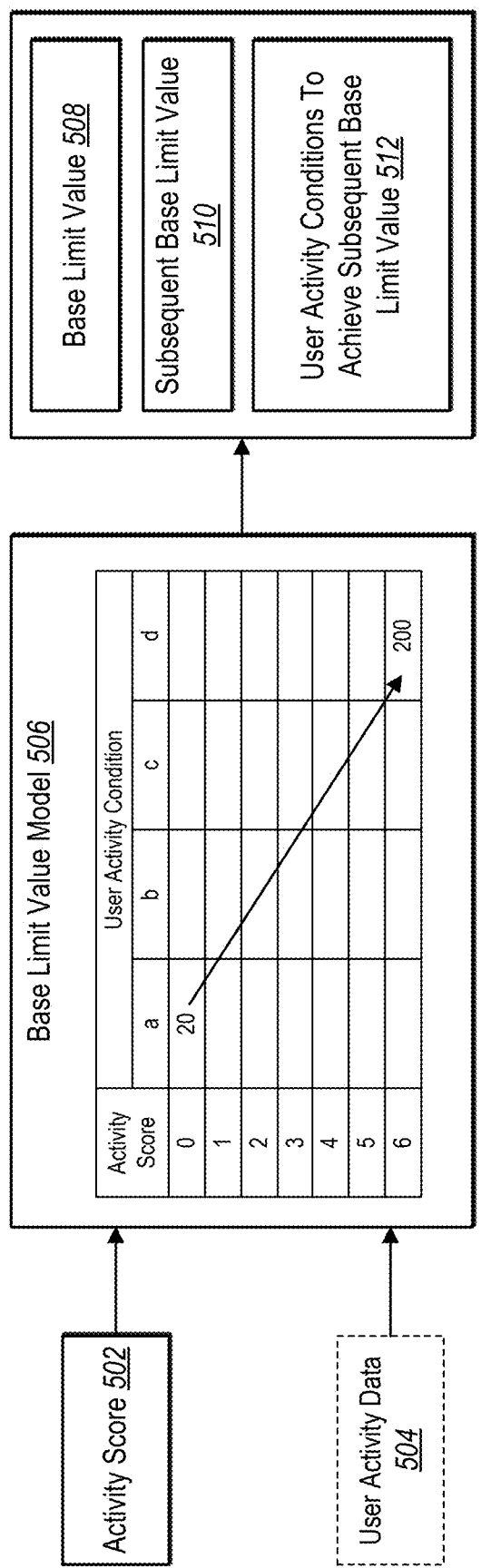
FIG. 5 illustrates a dynamic base limit value modification system determining a base limit value utilizing a base limit value matrix in accordance with one or more implementations.

As previously mentioned, the dynamic base limit value modification system 106 can determine a base limit value from an activity score utilizing a base limit value model. For example, FIG. 5 illustrates the dynamic base limit value modification system 106 utilizing a base limit value matrix as the base limit value model to determine a base limit value for a user account. Indeed, FIG. 5 illustrates the dynamic base limit value modification system 106 utilizing an activity score generated for a user account with a base limit value matrix to determine a base limit value.

As shown in FIG. 5, the dynamic base limit value modification system 106 utilizes an activity score 502 (and user activity data 504) to determine a base limit value from a base limit value model 506 (e.g., a base limit value matrix). As shown in FIG. 5, the dynamic base limit value modification system 106 can reference the base limit value model 506 to identify a base limit value that maps to the activity score 502. As an example, for an activity score of zero (e.g., a high risk user account), the dynamic base limit value modification system 106 can determine a base limit value from a section of the base limit value model 506 that corresponds to the activity score of zero within the matrix.

In addition, as shown in FIG. 5, the dynamic base limit value modification system 106 can also utilize the user activity data 504. In particular, the dynamic base limit value modification system 106 can reference the base limit value model 506 to identify a base limit value that maps to the activity score 502 and a user activity condition. For instance, the user activity condition can include a conditional action that triggers a mapping to a base limit value under the section of the base limit value model 506 for the user activity condition. To illustrate, upon determining that the activity score 502 is six and the user activity data 504 triggers (or maps) to the user activity condition "d," the dynamic base limit value modification system 106 can determine a base limit value of 200. As shown in FIG. 5, the dynamic base limit value modification system 106 can determine a base limit value 508, a subsequent base limit value 510, and user activity conditions to achieve the subsequent base limit value 512 from the base limit value model 506.

In some embodiments, the dynamic base limit value modification system 106 can utilize an account deposit amount as the user activity condition within the base limit value model 506. For example, the user activity condition can include a deposit transaction activity of a particular deposit amount. Moreover, in one or more embodiments, the dynamic base limit value modification system 106 can determine from the user activity data 504 a deposit transaction activity of the user account (e.g., a deposit transaction activity of 2000 dollars). Then, upon determining that the activity score 502 is six and the user activity data 504 triggers (or maps) to the user activity condition "d" when the condition is a deposit transaction of 2000 dollars, the dynamic base limit value modification system 106 can determine a base limit value of 200 for the user account.

Although one or more embodiments describes a deposit transaction activity as the user activity condition, the dynamic base limit value modification system 106 can utilize various user activity data for the user activity condition. For instance, the user activity condition within a base limit value matrix can include a frequency of a deposit transaction, a user-to-user transaction activity, and/or a spending transaction activity. Indeed, the dynamic base limit value modification system 106 can map user activity data and activity score from a user account to a base limit value matrix to determine a base limit value for the user account.

Although one or more embodiments herein illustrate the dynamic base limit value modification system 106 utilizing user activity conditions and activity scores as variables within a base limit value model (e.g., base limit value matrix) to determine a base limit value for a user account, in one or more embodiments, the dynamic base limit value modification system 106 can utilize various dimensions of variables in the base limit value model (e.g., base limit value matrix). For instance, in some cases, the dynamic base limit value modification system 106 can utilize a base limit value matrix that represents relationships (or mappings) between user activity condition tiers, activity scores, and particular risk segments of a user account. Indeed, the dynamic base limit value modification system 106 can input activity condition tiers, activity scores, and particular risk segments corresponding to a user account within the base limit value model (e.g., base limit value matrix) to select (or output) a base limit value for the user account.

In addition, the dynamic base limit value modification system 106 can also determine a subsequent base limit value for a user account from a base limit value matrix. For example, the dynamic base limit value modification system 106 can determine the next incremental step (or change) in base limit values in relation to a determined base limit value from a base limit value matrix as the subsequent base limit value. For instance, the dynamic base limit value modification system 106 can determine that when a base limit value is 20 and, within the same activity score, the next achievable base limit value that is an element in the base limit value matrix is 30, the dynamic base limit value modification system 106 can determine that the subsequent base limit value is 30.

Moreover, the dynamic base limit value modification system 106 can also determine one or more user activity conditions within the base limit value matrix to achieve the subsequent base limit value. For instance, the dynamic base limit value modification system 106 can identify from the base limit value matrix, the user activity condition that changes the determined base limit value to the subsequent base limit value. As an example, in reference to FIG. 5, the dynamic base limit value modification system 106 can determine that in order to move from a base limit value of 20 to the subsequent base limit value (e.g., 30), the user account needs to satisfy the user activity condition "b" from the user activity condition "a." Accordingly, the dynamic base limit value modification system 106 can determine and provide that the user activity condition "b" achieves the subsequent base limit value for the user account.

Figure 6:
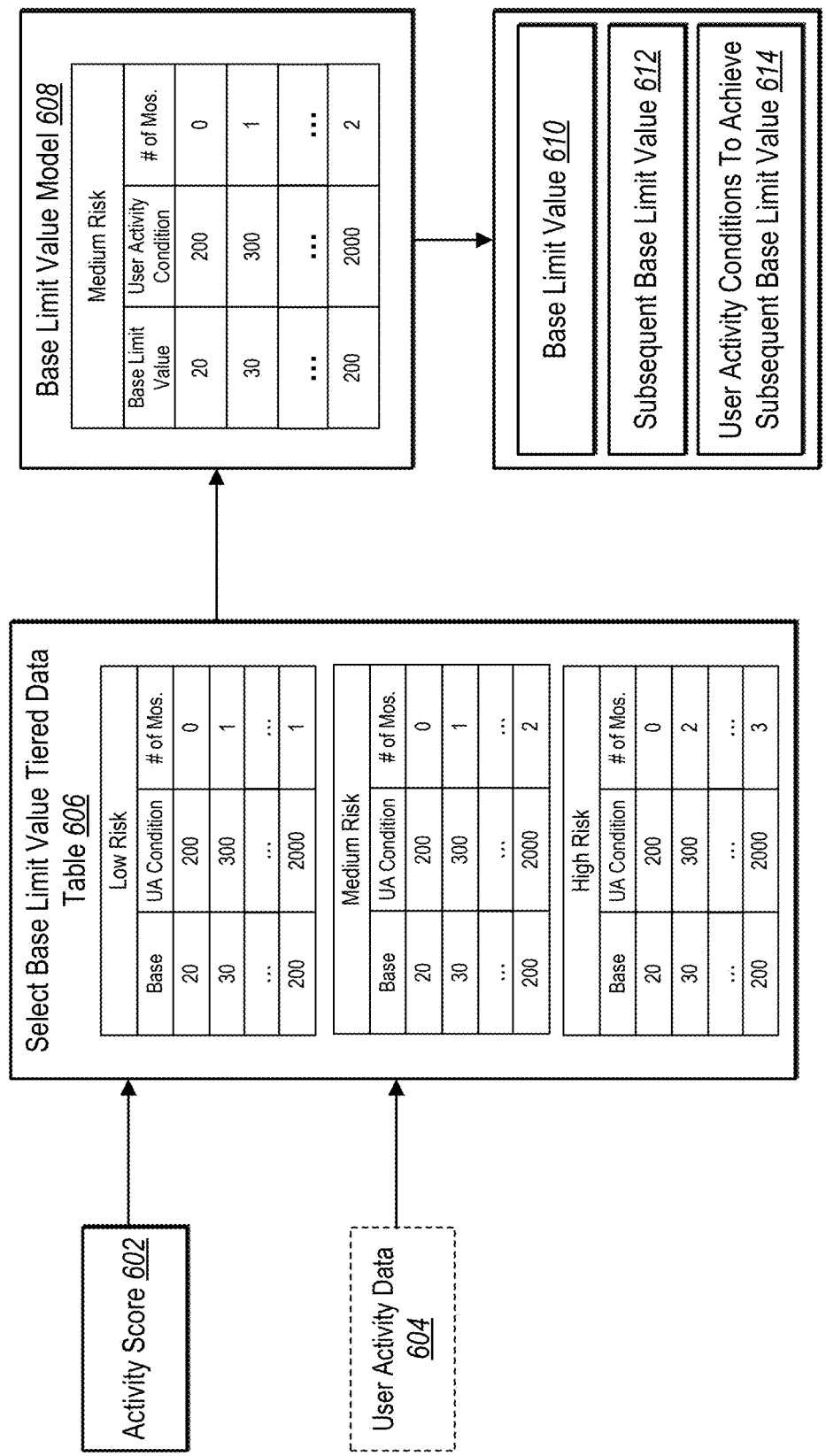
FIG. 6 illustrates a dynamic base limit value modification system 106 determining a base limit value utilizing a base limit value tiered data table in accordance with one or more implementations.

As mentioned above, in one or more embodiments, the dynamic base limit value modification system 106 utilizes a base limit value tiered data table as a base limit value model to determine a base limit value for a user account. For instance, FIG. 6 illustrates the dynamic base limit value modification system 106 utilizing a base limit value tiered data table to determine a base limit value for a user account. As shown in FIG. 6, the dynamic base limit value modification system 106 can select a base limit value tiered data table from multiple base limit value tiered data tables and then utilize the selected base limit value tiered data table to identify a base limit value, a subsequent base limit value, and one or more user activity conditions to achieve the subsequent base limit value.

For instance, in an act 606 of FIG. 6, the dynamic base limit value modification system 106 selects a base limit value tiered data table from multiple base limit value tiered data tables utilizing an activity score 602 (and/or user activity data 604). In particular, as shown in FIG. 6, each base limit value tiered data table corresponds to a varying risk category or risk segment (e.g., low risk, medium risk, and high risk). As mentioned above, the dynamic base limit value modification system 106 can utilize the activity score 602 to determine a risk category (or segment) for a user account (e.g., a first range of activity scores can correspond to a low risk level and a second range of activity scores can correspond to a high risk level). In some instances, the dynamic base limit value modification system 106 selects the base limit value tiered data table (in the act 606 of FIG. 6) that matches with to a risk level of an activity score (e.g., activity score 602) generated for a user account. As shown in FIG. 6, the dynamic base limit value modification system 106 selects the base limit value tiered data table for the medium risk level as the base limit value model 608.

As further illustrated in FIG. 6, the base limit value model 608 (e.g., a base limit value tiered data table) includes base limit values and user activity conditions to progress to a subsequent tier of the base limit value. For example, as shown in FIG. 6, the dynamic base limit value modification system 106 can determine a base limit value 610 based on the user activity data 604. For example, the dynamic base limit value modification system 106 can determine a base limit value of 20 when the user activity data 604 indicates that a user account has satisfied the user activity condition (e.g., a deposit transaction of 200) for at least zero months. Furthermore, the dynamic base limit value modification system 106 can determine a base limit value of 30 for the user account when the user activity data 604 indicates that the user account has satisfied the user activity condition of a deposit transaction of 300 for at least one month. In addition, as also shown in FIG. 6, the dynamic base limit value modification system 106 can determine a base limit value of 200 for the user account when the user activity data 604 indicates that the user account has satisfied the user activity condition of a deposit transaction of 2000 dollars for at least two months (after satisfying the previous user activity conditions in the base limit value tiered data table).

In some embodiments, the dynamic base limit value modification system 106 can directly determine a higher base limit value (e.g., 200). For instance, the dynamic base limit value modification system 106 can identify that the user account activity data of a user account indicates that a user activity condition of a deposit transaction for the higher base limit value has been performed by the user account for a number of months having a sum that totals the number of months in the base limit value tiered data table from the lowest base limit value to the determined base limit value. Accordingly, the dynamic base limit value modification system 106, in some embodiments, directly assigns the higher base limit value to a user account having such user activity data.

In addition, as shown in FIG. 6, the dynamic base limit value modification system 106 can also determine a subsequent base limit value 612 from the base limit value model 608 (e.g., a base limit value tiered data table). In reference to the base limit value model 608 of FIG. 6 (representing a base limit value tiered data table), the dynamic base limit value modification system 106 can select a next tier base limit value from a determined base limit value as the subsequent base limit value. For instance, in a base limit value tiered data table, the dynamic base limit value modification system 106 can select the next base limit value on the next tier (e.g., on the next row of a tiered data table) as the subsequent base limit value. As an example, in the base limit value model 608 of FIG. 6, the dynamic base limit value modification system 106 can determine that 30 is the subsequent base limit value when the determined base limit value for a user account is 20.

Furthermore, as illustrated in FIG. 6, the dynamic base limit value modification system 106 can also determine one or more user activity conditions to achieve a subsequent base limit value 614 from the base limit value model 608 (e.g., a base limit value tiered data table). For example, the dynamic base limit value modification system 106 can select the user activity conditions corresponding to the subsequent base limit value tier in the tiered data table as the user activity conditions that achieve the subsequent base limit value. For example, in the base limit value model 608 of FIG. 6, the dynamic base limit value modification system 106 can determine that a user activity condition of a deposit transaction of 300 for one month to achieve a subsequent base limit value of 30 when the determined base limit value for a user account is 20.

In one or more embodiments, the dynamic base limit value modification system 106 generates each base limit value tiered data table from a set of base limit value tiered data tables to be configured for a set of user accounts based on activity scores. In particular, the dynamic base limit value modification system 106 can associate a first base limit value tiered data table to a first activity score by selecting (or generating) values for the first base limit value tiered data table to reflect a risk level represented by the first activity score (e.g., user activity conditions that are less stringent based on a low risk level associated with a user account). In addition, the dynamic base limit value modification system 106 can associate a second base limit value tiered data table to a second activity score by selecting (or generating) values for the second base limit value tiered data table to reflect a risk level represented by the second activity score (e.g., user activity conditions that are more stringent based on a high risk level associated with a user account).

Although one or more embodiments illustrate the dynamic base limit value modification system 106 categorizing base limit value tiered data tables based on risk levels, the dynamic base limit value modification system 106 can utilize various metrics from various types of activity scores to categorize and/or select base limit value tiered data tables. For example, the dynamic base limit value modification system 106 can utilize metrics such as, but not limited to, an interest (or satisfaction) value of a user account, a conversion probability for the user account, and/or a loyalty of the user account to categorize (and/or configure) base limit value tiered data tables. In addition, the dynamic base limit value modification system 106 can utilize an activity score that corresponds to the various metrics to select a base limit value tiered data table in accordance with one or more embodiments herein.

Additionally, although one or more embodiments describes a deposit transaction activity as the user activity condition for the base limit value tiered data tables, the dynamic base limit value modification system 106 can utilize various user activity data for the user activity condition in the base limit value tiered data tables. For example, the user activity condition within a base limit value tiered data table can include a user-to-user transaction activity and/or a spending transaction activity. In addition, the base limit value tiered data table can include various combinations of the user activity conditions such as, but not limited to, a user-to-user transaction activity and a number of times the user-to-user transaction activity occurs and/or a spending transaction activity frequency and a value amount of the spending transaction activities.

In one or more embodiments, the values associated with a base limit value model (e.g., a base limit value matrix and/or a base limit value tiered data table) can be generated (or populated) utilizing a machine learning model. As an example, the dynamic base limit value modification system 106 can train a machine learning model (e.g., a decision tree model, a regression model, a classification model) to determine (or predict) base limit values for varying activity scores and/or user activity conditions (e.g., mappings that are likely to result in a non-default success rate that satisfies a threshold non-default success rate). Then, the dynamic base limit value modification system 106 can utilize the machine learning model to generate a base limit value model by populating data values of the base limit value model based on the determined base limit values and predicted mappings to user activity conditions and/or activity scores.

In some embodiments, the values corresponding to the base limit value model can be configured and/or modified by an administrator user on an administrator device. For instance, the dynamic base limit value modification system 106 can receive a selection and/or input value for a particular value or element within the base limit value model. Then, the dynamic base limit value modification system 106 can utilize the selection and/or input to modify a base limit value, activity score, and/or a user activity condition within the base limit value model. As an example, the dynamic base limit value modification system 106 can receive a user interaction from an administrator device to modify the base limit value associated with a user activity condition of a deposit transaction of 300 from a base limit value of 30 to 35.

Although one or more embodiments describes the dynamic base limit value modification system 106 utilizing a base limit value model and activity score (from the activity machine learning model) to determine base limit values, the dynamic base limit value modification system 106 an utilize the base limit value model and activity score to determine various types of values for a user account. For instance, the dynamic base limit value modification system 106 can determine a lending credit value (and subsequent lending credit value) for a user account in accordance with one or more embodiments herein. In some embodiments, the dynamic base limit value modification system 106 can determine a credit line (and subsequent credit line) for a user account in accordance with one or more embodiments herein. Furthermore, the dynamic base limit value modification system 106 can also determine a transfer limit (and subsequent transfer limit) for a user account in accordance with one or more embodiments herein.

Additionally, in one or more embodiments, the dynamic base limit value modification system 106 can determine base limit values using base limit value models (e.g., base limit matrices and/or base limit value tiered data tables) as described in U.S. application Ser. No. 17/519,129, the contents of which are herein incorporated by reference in their entirety.

Figure 7:
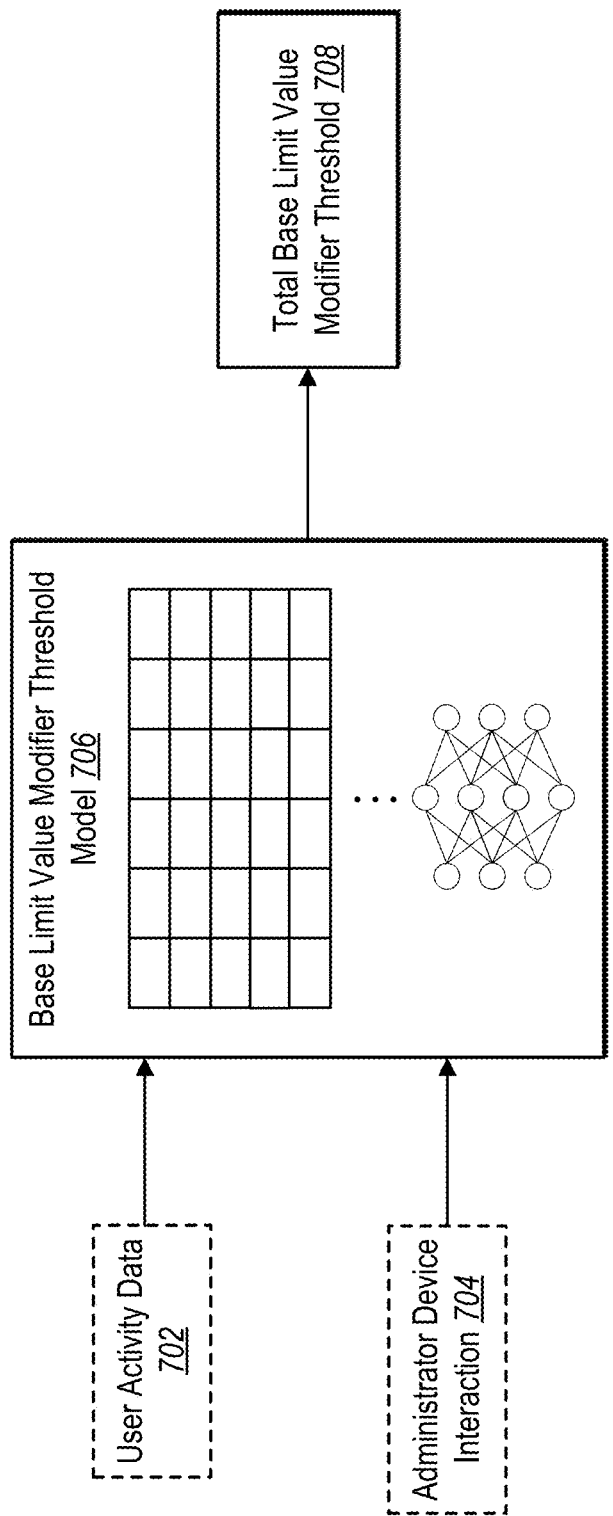
FIG. 7 illustrates a dynamic base limit value modification system determining a total base limit value modifier threshold in accordance with one or more implementations.

In one or more implementations, the dynamic base limit value modification system 106 determines a total base limit value modifier threshold. For instance, FIG. 7 illustrates the dynamic base limit value modification system 106 determining a total base limit value modifier threshold. As shown in FIG. 7, the dynamic base limit value modification system 106 can utilize user activity data 702 and/or administrator device interactions 704 with a base limit value modifier threshold model 706 to determine a total base limit value modifier threshold 708.

In some cases, the dynamic base limit value modification system 106 utilizes the user activity data 702, for a particular user account, with the base limit value modifier threshold model 706 to determine a total base limit value modifier threshold 708 for the user account. As an example, in some cases, the dynamic base limit value modification system 106 utilizes a machine learning model trained to determine a total base limit value modifier threshold upon analyzing (or receiving as input) user activity data for the user account. For instance, the dynamic base limit value modification system 106 can utilize the machine learning model to predict or classify a particular total base limit value modifier threshold (or a total base limit value modifier threshold range) for a user account based on the user activity data.

In some implementations, the dynamic base limit value modification system 106 utilizes the user activity data 702, with the base limit value modifier threshold model 706, to determine a total base limit value modifier threshold 708 for the user account based on mappings between user account activity data and one or more threshold values. For example, the dynamic base limit value modification system 106 can utilize a decision tree, matrix, and/or table-based base limit value modifier threshold model that maps one or more user account activities to a particular total base limit value modifier threshold (or a total base limit value modifier threshold range). Indeed, the dynamic base limit value modification system 106 can identify, for a user account, a particular total base limit value modifier threshold (or a total base limit value modifier threshold range) that maps to one or more user account activities from user activity data of the user account from the base limit value modifier threshold model 706.

In one or more instances, the dynamic base limit value modification system 106 can utilize a base limit value modifier threshold model 706 that enables an administrator device to configure a global total base limit value modifier threshold for one or more user accounts. In particular, the dynamic base limit value modification system 106 can receive a global total base limit value modifier threshold configuration setting from the administrator device interaction 704 (on an administrator device) and utilize the configuration setting to set the total base limit value modifier threshold for one or more user accounts. In some cases, the dynamic base limit value modification system 106 can receive multiple configuration settings from the administrator device interaction 704 to set one or more total base limit value modifier thresholds for particular user account activities (within the base limit value modifier threshold model) and/or specific user accounts (e.g., individual threshold values that are specific for a user account).

In some cases, the dynamic base limit value modification system 106 can modify (or update) one or more total base limit value modifier thresholds. For example, upon receiving an update from the user activity data 702, the dynamic base limit value modification system 106 can utilize the base limit value modifier threshold model 706 to determine an updated total base limit value modifier threshold for a user account. In some cases, the dynamic base limit value modification system 106 can also receive one or more updated base limit value modifier thresholds from an administrator device (via the administrator device interaction 704) and update one or more base limit value modifier thresholds (e.g., global and/or user specific).

Furthermore, as previously mentioned, the dynamic base limit value modification system 106 can generate a base limit value modifier for a user account. To illustrate, in one or more implementations, the dynamic base limit value modification system 106 utilizes one or more digital user account actions to generate (or determine) one or more base limit value modifiers. For example, FIG. 8 illustrates the dynamic base limit value modification system 106 generating one or more base limit value modifiers for a user account.

Figure 8:
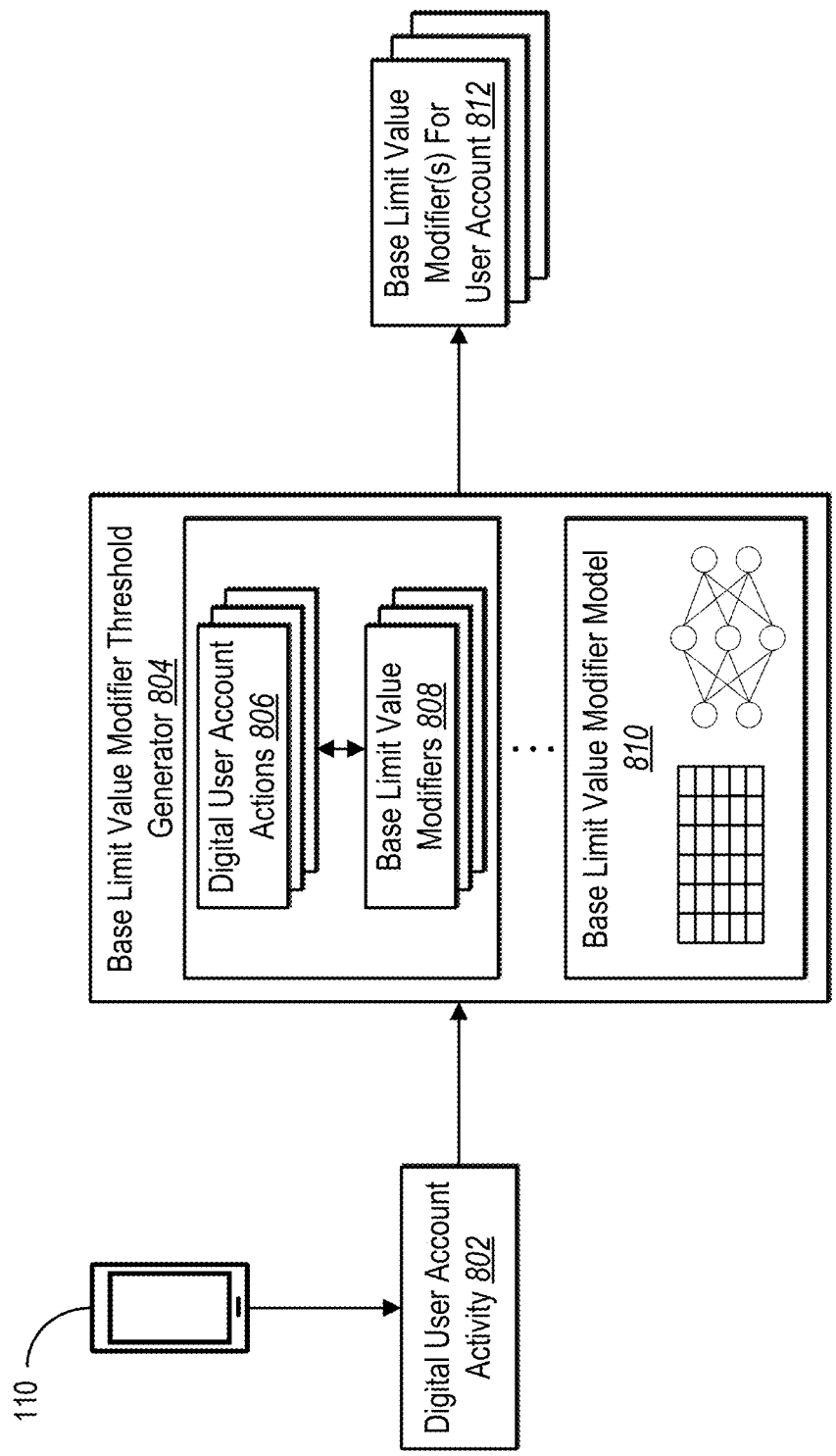
FIG. 8 illustrates a dynamic base limit value modification system generating one or more base limit value modifiers in accordance with one or more implementations.

As shown in FIG. 8, the dynamic base limit value modification system 106 receives, from a client device 110, digital user account activity 802. In particular, the digital user account activity 802 can include one or more digital user account actions (as described above). Moreover, as shown in FIG. 8, the dynamic base limit value modification system 106 utilizes the digital user account activity 802 with a base limit value modifier generator 804 to generate one or more base limit value modifier(s) for the user account 812.

In some cases, as shown in FIG. 8, the dynamic base limit value modification system 106 utilizes mappings between digital user account actions 806 and base limit value modifiers 808 from a base limit value modifier generator 804 to generate the one or more base limit value modifier(s) for the user account 812. In particular, the dynamic base limit value modification system 106 can identify relationships between digital user account actions and one or more base limit value modifiers within a mapping (e.g., a decision tree, a rule-based model, a matrix) that associates digital user account actions to the one or more base limit value modifiers. In one or more implementations, the dynamic base limit value modification system 106 utilizes the relationships within the mappings to select one or more base limit value modifiers for the user account (according to the digital user account actions detected from the user account).

In some instances, the dynamic base limit value modification system 106 utilizes a base limit value modifier model 810 from the base limit value modifier generator 804 to generate the one or more base limit value modifier(s) for the user account 812. In particular, the dynamic base limit value modification system 106 can utilize one or more digital user account actions as input into a base limit value modifier model 810 that predicts (or determines) one or more base limit value modifiers for the input digital user account actions. For example, the base limit value modifier model 810 can include a machine learning model trained to determine (or predict) patterns and/or probabilities for varying base limit value modifiers in the presence of one or more digital user account actions (or types of digital user account actions) detected from the user account.

Indeed, as shown in FIG. 8, the dynamic base limit value modification system 106 can determine one or more base limit value modifiers for a user account 812. In particular, the dynamic base limit value modification system 106 can generate a list of base limit value modifiers applicable for a user account based on the one or more digital user account actions that correspond to the user account. In some instances, the dynamic base limit value modification system 106 assigns the list of base limit value modifiers to the user account and determines which of the base limit value modifiers to actively apply in the user account in accordance with one or more implementations herein.

Indeed, as just mentioned, the dynamic base limit value modification system 106 can determine active and/or inactive base limit value modifiers from base limit value modifiers determined for a user account (e.g., to actively apply in the user account). For instance, in one or more implementations, the dynamic base limit value modification system 106 utilizes a total base limit value modifier threshold to determine active and/or inactive base limit value modifiers for a user account. Indeed, FIG. 9 illustrates the dynamic base limit value modification system 106 utilizing a base limit value modifier threshold to determine various active and/or inactive base limit value modifiers for a user account.

Figure 9:
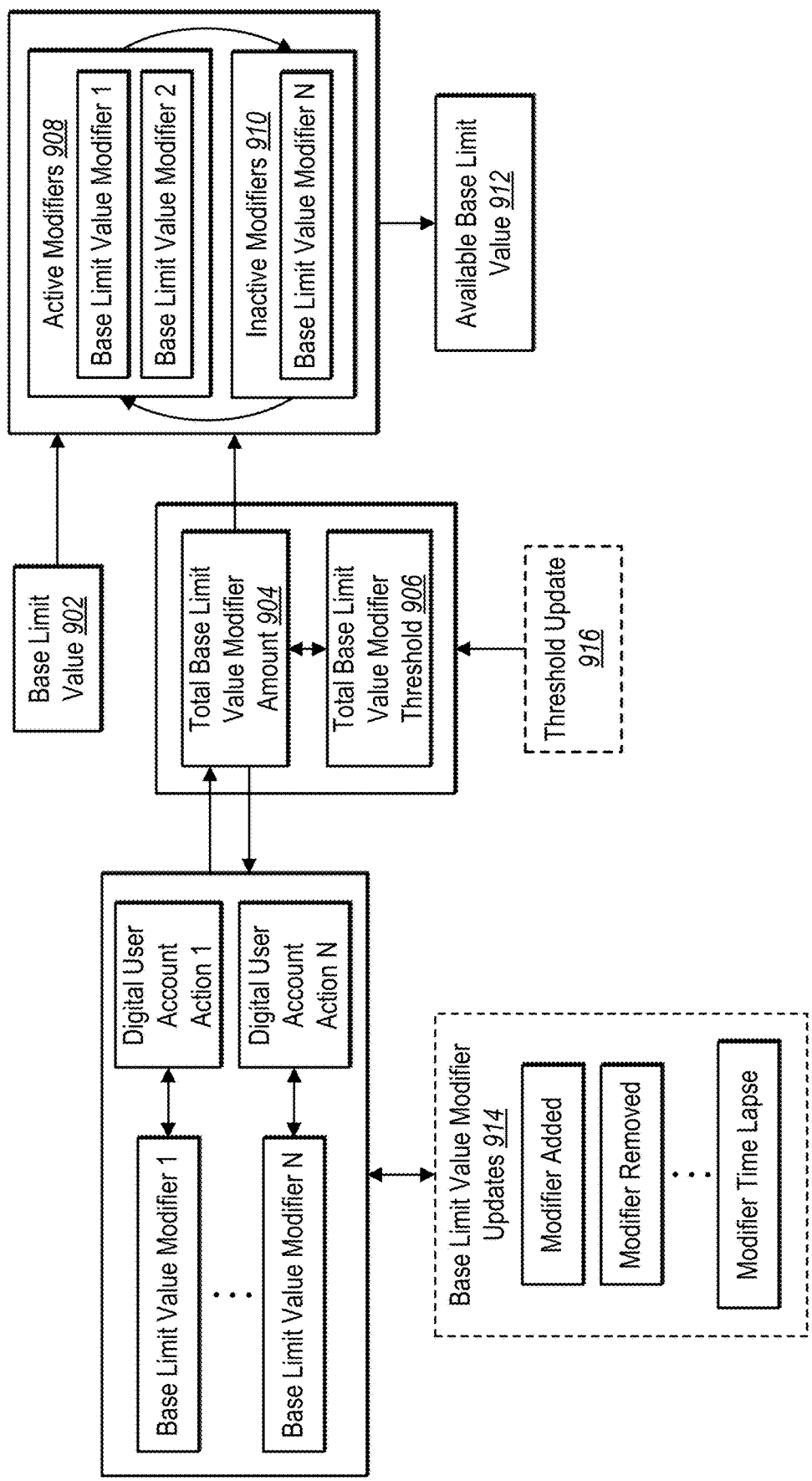
FIG. 9 illustrates a dynamic base limit value modification system utilizing a base limit value modifier threshold to determine active and/or inactive base limit value modifiers in accordance with one or more implementations.

For instance, as shown in FIG. 9, the dynamic base limit value modification system 106 identifies one or more base limit value modifiers (e.g., base limit value modifiers 1-N) corresponding to digital user account actions (e.g., digital user account actions 1-N) for a user account. Moreover, as shown in FIG. 9, the dynamic base limit value modification system 106 combines one or more base limit value modifiers (from the base limit value modifiers 1-N) to generate a total base limit value modifier amount 904. Furthermore, the dynamic base limit value modification system 106 determines whether the one or more combined base limit value modifiers, via the total base limit value modifier amount 904, falls within a total base limit value modifier threshold 906. Upon determining the one or more combined base limit value modifiers fall within the total base limit value modifier threshold 906, the dynamic base limit value modification system 106 sets the one or more base limit value modifiers as active modifiers 908 (e.g., in an active state). In some cases, the dynamic base limit value modification system 106 continues to add a base limit value modifier from the base limit value modifiers 1-N to the total base limit value modifier amount 904 (and compare the total to the total base limit value modifier threshold 906) to identify one or more active base limit value modifiers.

In some cases, the dynamic base limit value modification system 106 can determine that a base limit value modifier, when included in the total base limit value modifier amount 904, causes the total base limit value modifier amount 904 to not fall within (or exceeds) the total base limit value modifier threshold 906. Indeed, when the base limit value modifier causes the total base limit value modifier amount 904 to exceed the total base limit value modifier threshold 906, the dynamic base limit value modification system 106 can set the base limit value modifier as an inactive modifier 910 (e.g., in an inactive state). In some implementations, the dynamic base limit value modification system 106 sets multiple base limit value modifiers (from the base limit value modifiers 1-N) as inactive when the base limit value modifiers do not fall within (or exceed) the total base limit value modifier threshold 906.

As an example, in reference to FIG. 9, the dynamic base limit value modification system 106 adds a base limit value modifier 1 into the total base limit value modifier amount 904 and compares the total base limit value modifier amount 904 to the total base limit value modifier threshold 906 (determining that the total falls within the threshold) to determine the base limit value modifier 1 as an active modifier in the active modifiers 908. To continue the example, the dynamic base limit value modification system 106 adds a base limit value modifier 2 into the total base limit value modifier amount 904 and compares the total base limit value modifier amount 904 to the total base limit value modifier threshold 906 (determining that the total falls within the threshold) to determine the base limit value modifier 2 as an active modifier in the active modifiers 908. Moreover, as shown in FIG. 9, the dynamic base limit value modification system 106 adds a base limit value modifier N into the total base limit value modifier amount 904 and compares the total base limit value modifier amount 904 to the total base limit value modifier threshold 906 (determining that the total exceeds the threshold) to determine the base limit value modifier N as an inactive modifier in the inactive modifiers 910.

In one or more embodiments, the dynamic base limit value modification system 106 iteratively includes base limit value modifiers corresponding to a user account to compare a total base limit value modifier amount to a total base limit value modifier threshold when determining active and/or inactive modifiers. For instance, in some cases, the dynamic base limit value modification system 106 adds base limit value modifiers chronologically (e.g., from oldest identified modifiers to newest identified modifiers or vice versa). In some instances, the dynamic base limit value modification system 106 adds the base limit value modifiers based on amounts associated with the base limit value modifiers (e.g., add highest modifier values followed by lowest modifier values, add lowest modifier values followed by highest modifier values). In some instances, the dynamic base limit value modification system 106 adds the base limit value modifiers based on when the base limit value modifiers lapse or expire (e.g., add base limit value modifiers that are lapsing the soonest, first). Moreover, in some cases, the dynamic base limit value modification system 106 ranks or orders the list of base limit value modifiers utilizing a prioritization (e.g., a ranking and/or indication of importance for the base limit value modifiers) to adds base limit value modifier for comparison with the total base limit value modifier threshold when determining active and/or inactive modifiers.

Moreover, in some cases, the dynamic base limit value modification system 106 can iterate through a list of base limit modifiers corresponding to the user account to maximize a total amount in comparison to the base limit modifier threshold. For instance, upon determining that a base limit value modifier causes the total base limit value modifier amount to exceed the total base limit value modifier threshold, the dynamic base limit value modification system 106 can iterate through other available base limit value modifiers to identify modifiers that do not exceed the threshold. Indeed, the dynamic base limit value modification system 106 can determine a combination of active base limit value modifiers that utilize the maximum amount possible under the total base limit value modifier threshold.

Additionally, as shown in FIG. 9, the dynamic base limit value modification system 106 utilizes the active modifiers 908 with a base limit value 902 to generate an available base limit value 912. For instance, in some cases, the dynamic base limit value modification system 106 adds the active modifiers 908 to the base limit value 902 to determine the available base limit value 912. In some implementations, the dynamic base limit value modification system 106 multiplies the base limit value 902 with the active modifiers 908 (or a summation of the active modifiers 908) to generate the available base limit value 912. Furthermore, the dynamic base limit value modification system 106 can continue to track the inactive modifiers 910 without applying the inactive modifiers 910 to the base limit value 902.

In addition, in one or more embodiments, the dynamic base limit value modification system 106 updates active modifiers and/or inactive modifiers based on a change in base limit value modifier settings. Indeed, as shown in FIG. 9, the dynamic base limit value modification system 106 can identify base limit value modifier updates 914 for a user account. As shown in FIG. 9, the base limit value modifier updates 914 can include, but are not limited to, an addition of a base limit value modifier, a removal of a base limit value modifier, and/or a time lapse of an existing base limit value modifier. For instance, upon identifying a base limit value modifier update, the dynamic base limit value modification system 106 can update determinations of active modifiers, inactive modifiers, and/or the available base limit value for the user account.

For example, in some cases, the dynamic base limit value modification system 106 can receive (or identify) an update that indicates an addition of a base limit value modifier. In reference to FIG. 9, the dynamic base limit value modification system 106 can utilize the newly added base limit value modifier in the total base limit value modifier amount 904 to determine whether the newly added base limit value modifier will be active or inactive. Indeed, upon determining that the newly added base limit value modifier does not cause the total base limit value modifier amount 904 to exceed the total base limit value modifier threshold 906, the dynamic base limit value modification system 106 can include the newly added base limit value modifier in the active modifiers 908 (and as part of the available base limit value 912). Alternatively, in some cases, upon determining that the newly added base limit value modifier causes the total base limit value modifier amount 904 to exceed the total base limit value modifier threshold 906, the dynamic base limit value modification system 106 can include the newly added base limit value modifier in the inactive modifiers 910.

In some implementations, the dynamic base limit value modification system 106 can identify an update that indicates a removal of a base limit value modifier from the user account. For instance, the dynamic base limit value modification system 106 can identify a removal of a base limit value modifier based on, but not limited to, a user interaction to remove the base limit value modifier, a time lapse (or expiration) of the base limit value modifier (e.g., a modifier time lapse), and/or a configuration update from an administrator device removing the base limit value modifier.

Indeed, upon determining that the removed base limit value modifier causes the total base limit value modifier amount 904 to not exceed the total base limit value modifier threshold 906, the dynamic base limit value modification system 106 can identify one or more inactive base limit value modifiers available to the user account that do not exceed the total base limit value modifier threshold and transition the identified inactive base limit value modifier(s) to active modifiers 908. For example, the dynamic base limit value modification system 106 can set the inactive modifiers to an active state and as part of the available base limit value 912. Furthermore, the dynamic base limit value modification system 106 can modify user interface elements in a graphical user interface (as to display a transition of the one or more inactive modifiers to active modifiers (e.g., moving the inactive modifiers into a user interface element that indicates active modifiers) and/or display an updated available base limit value for the user account as described below (e.g., in relation to FIGS. 10-13).

In one or more cases, the dynamic base limit value modification system 106 can utilize a variety of updates to the base limit value modifiers to modify the active and inactive base limit value modifiers corresponding to the user account. Furthermore, the dynamic base limit value modification system 106 can utilize the one or more updated active and/or inactive base limit value modifiers to update the available base limit value corresponding to the user account (in accordance with one or more implementations herein). In addition, the dynamic base limit value modification system 106 can modify one or more graphical user interfaces to display the updated active and/or inactive base limit value modifiers and/or available base limit value as described below (e.g., in relation to FIGS. 10-13).

Furthermore, as shown in FIG. 9, in some cases, the dynamic base limit value modification system 106 identifies a threshold update 916 for the total base limit value modifier threshold 906. In response to the threshold update 916, the dynamic base limit value modification system 106 can modify the active modifiers 908 and/or the inactive modifiers 910 to reflect the updated total base limit value modifier threshold. For instance, upon identifying an increase in the total base limit value modifier threshold, the dynamic base limit value modification system 106 can determine one or more inactive base limit value modifiers (that fall within the updated base limit value modifier threshold) to transition to an active state in accordance with one or more implementations herein. Likewise, upon identifying a decrease in the total base limit value modifier threshold, the dynamic base limit value modification system 106 can determine one or more active base limit value modifiers (that exceed the updated base limit value modifier threshold) to transition to an inactive state in accordance with one or more implementations herein. Additionally, the dynamic base limit value modification system 106 can update a display of the active and/or inactive base limit value modifiers in response to the updated total base limit value modifier threshold by moving the displayed modifiers between active and inactive states.

Although one or more embodiments herein illustrate a specific number of base limit value modifiers, the dynamic base limit value modification system 106 can utilize various numbers of base limit value modifiers, modifier values, and/or active and inactive base limit value modifiers. Furthermore, although one or more embodiments herein illustrate the dynamic base limit value modification system 106 utilize base limit value modifiers to modify a base limit value, the dynamic base limit value modification system 106 can determine active and/or inactive modifiers (in accordance with one or more implementations herein) for various other values corresponding to a user account. For instance, the dynamic base limit value modification system 106 can determine and display active and/or inactive modifiers (in accordance with one or more implementations herein) for user account values, such as, credit values (e.g., an available credit balance), risk assessment values (e.g., credit scores), and/or available deposit transaction values (e.g., early access to predicted deposit transactions).

Additionally, in some cases, the dynamic base limit value modification system 106 utilizes a combined base limit value modifier between multiple account values. For instance, the dynamic base limit value modification system 106 can determine whether base limit value modifiers corresponding to different account values, when combined, exceed a total base limit value modifier threshold. Indeed, upon determining that the combined base limit value modifiers exceed the total base limit value modifier threshold, the dynamic base limit value modification system 106 can set additional base limit value modifiers for the one or more account values as inactive (e.g., in an inactive state).

As mentioned above, the dynamic base limit value modification system 106 can generate various GUIs for the available base limit value and base limit value modifiers. For instance, FIGS. 10-14 illustrate the dynamic base limit value modification system 106 generating various GUIs to display various available base limit values, active base limit value modifiers, and/or inactive base limit value modifiers (determined as described above). In addition, FIGS. 10-14 also illustrate the dynamic base limit value modification system 106 dynamically updating GUIs based on changes in the available base limit values, active base limit value modifiers, and/or inactive base limit value modifiers for a user account.

Figure 10A:
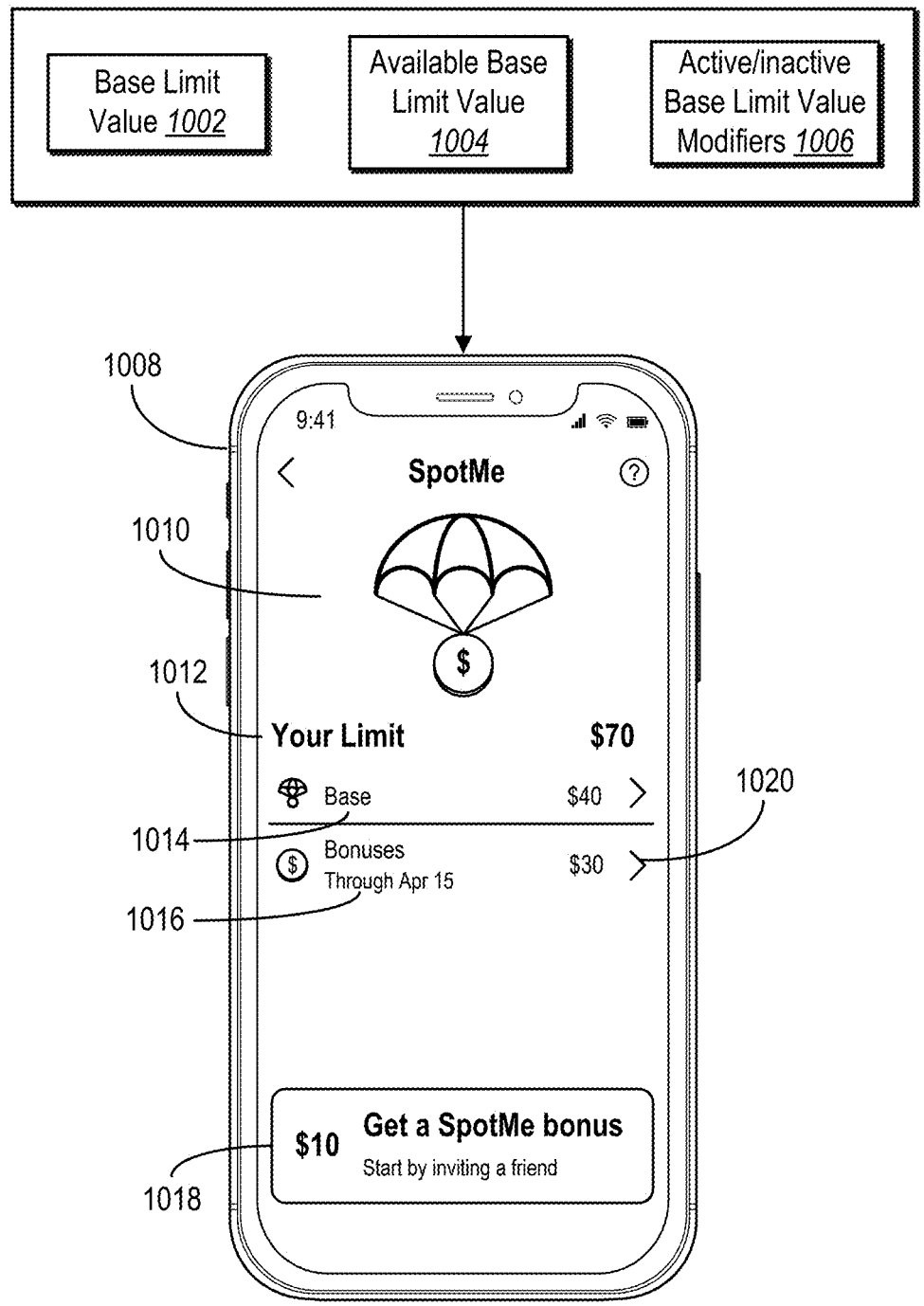
FIGS. 10A and 10B illustrate a dynamic base limit value modification system displaying graphical user interface elements for a base limit value and an available base limit value from one or more base limit value modifiers in accordance with one or more implementations.
Figure 10B:
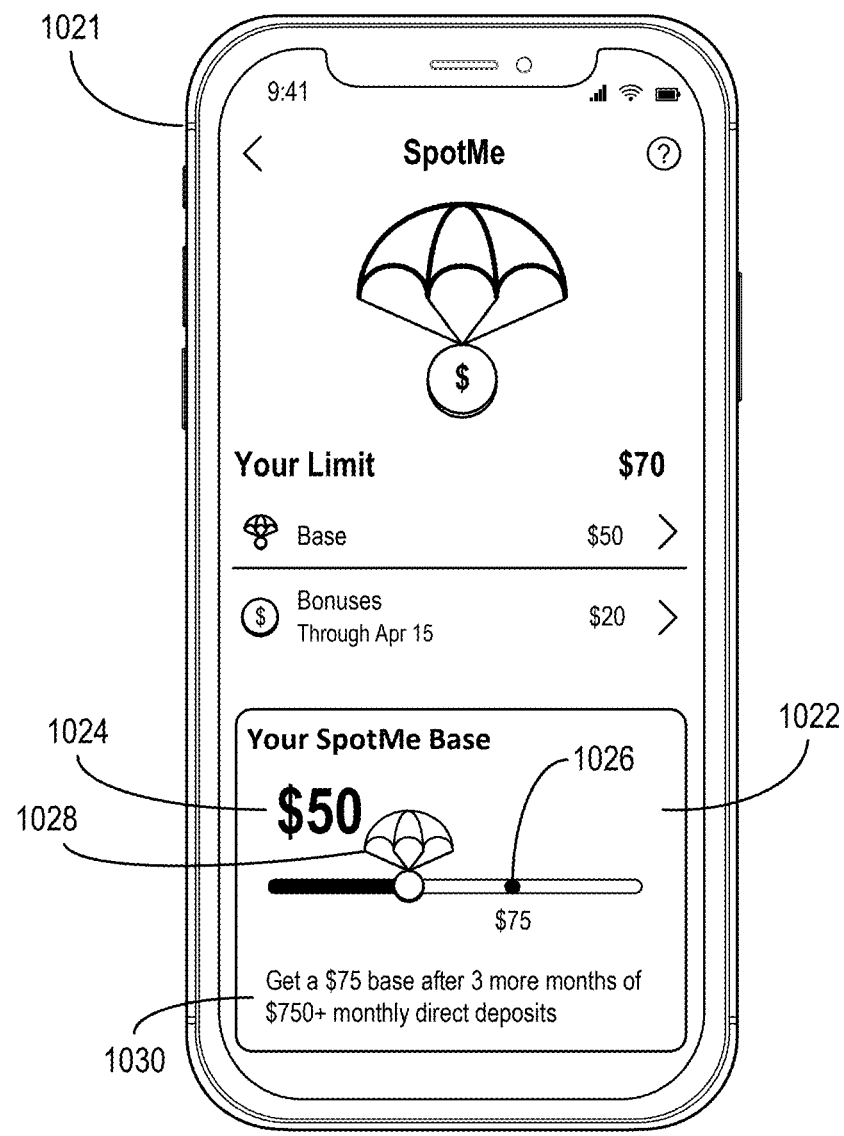

For example, FIGS. 10A and 10B illustrate the dynamic base limit value modification system 106 displaying graphical user interface elements for a base limit value and an available base limit value from one or more base limit value modifiers (determined in accordance with one or more implementations herein). As shown in FIG. 10A, the dynamic base limit value modification system 106 utilizes a base limit value 1002 and an available base limit value 1004 (e.g., determined using the active/inactive base limit value modifiers 1006) to provide, for display within a graphical user interface 1010 of a client device 1008, a user interface element 1012 to display the available base limit value 1004. As further shown in FIG. 10A, the dynamic base limit value modification system 106 provides, for display within the graphical user interface 1010, a user interface element 1014 to display a base limit value and an additional user interface element 1016 to display a total amount of active base limit value modifiers from the active/inactive base limit value modifiers 1006. Indeed, as shown in FIG. 10A, the dynamic base limit value modification system 106 displays a base limit value (in the user interface element 1014) of $40 and a base limit value modifier (in the user interface element 1016) of $30 to determine the available base limit value of $70 (in the user interface element 1012).

As further shown in FIG. 10A, the dynamic base limit value modification system 106 provides, for display within the graphical user interface 1010, a selectable user interface element 1020 to view one or more base limit value modifiers. For instance, upon receiving a user interaction indicating a selection of the selectable user interface element 1020, the dynamic base limit value modification system 106 can display information for one or more active and/or inactive base limit value modifiers within the graphical user interface 1010. Indeed, dynamic base limit value modification system 106 can display one or more active and/or inactive base limit value modifiers as described in FIGS. 11-14.

In some instances, the dynamic base limit value modification system 106 provides, for display within the graphical user interface, one or more selectable user interface elements to prompt a digital user account action to generate (or make available) an additional base limit value modifier. For instance, as shown in FIG. 10A, the dynamic base limit value modification system 106 provides, for display within the graphical user interface 1010, a selectable user interface element 1018 to initiate a digital action. Indeed, the dynamic base limit value modification system 106 can, upon receiving a user interaction with the selectable user interface element 1018, navigate to a graphical user interface to enable a digital user account action. In response to the digital user account action initiated via the selectable user interface element 1018, the dynamic base limit value modification system 106 can generate a base limit value modifier that corresponds to the initiated digital user account action for the user account (in accordance with one or more implementations herein).

Additionally, the dynamic base limit value modification system 106 can also display determined base limit values, subsequent base limit values, and user activity conditions within a graphical user interface. For instance, as shown in FIG. 10B, the dynamic base limit value modification system 106 provides for display, within the graphical user interface 1022 in a client device 1021, the base limit value 1024. Furthermore, as also illustrated in FIG. 10B, the dynamic base limit value modification system 106 provides for display, within the graphical user interface 1022, a user interface element 1026 that indicates a subsequent base limit value for the user account.

Moreover, as shown in FIG. 10B, the dynamic base limit value modification system 106 provides for display, within the graphical user interface 1022, a user interface element 1030 that indicates user activity conditions to achieve the subsequent base limit value (from the user interface element 1026). Indeed, the user interface element 1030 indicates an amount of a user activity condition of a deposit transaction (e.g., $750 or more) and a frequency of the deposit transaction (e.g., 3 more months) to achieve the subsequent base limit value (from the user interface element 1026).

In addition, as shown in FIG. 10B, the dynamic base limit value modification system 106 provides for display, within the graphical user interface 1022, a user interface element 1028 that displays a tracked progress of the user account to the subsequent base limit value. In one or more embodiments, the dynamic base limit value modification system 106 updates the location of the user interface element 1028 upon identifying updated user activity data for the user account. Indeed, the dynamic base limit value modification system 106 can display determined base limit values, subsequent base limit values, user activity conditions, and progress tracking elements for the user activity conditions within a graphical user interface as described in U.S. application Ser. No. 17/519,129 and U.S. application Ser. No. 18/062,496 filed Dec. 6, 2022, entitled GENERATING DYNAMIC BASE LIMIT VALUE USER INTERFACE ELEMENTS DETERMINED FROM A BASE LIMIT VALUE MODEL (hereinafter "application Ser. No. 18/062, 496"), the contents of both are herein incorporated by reference in their entirety.

Figure 11:
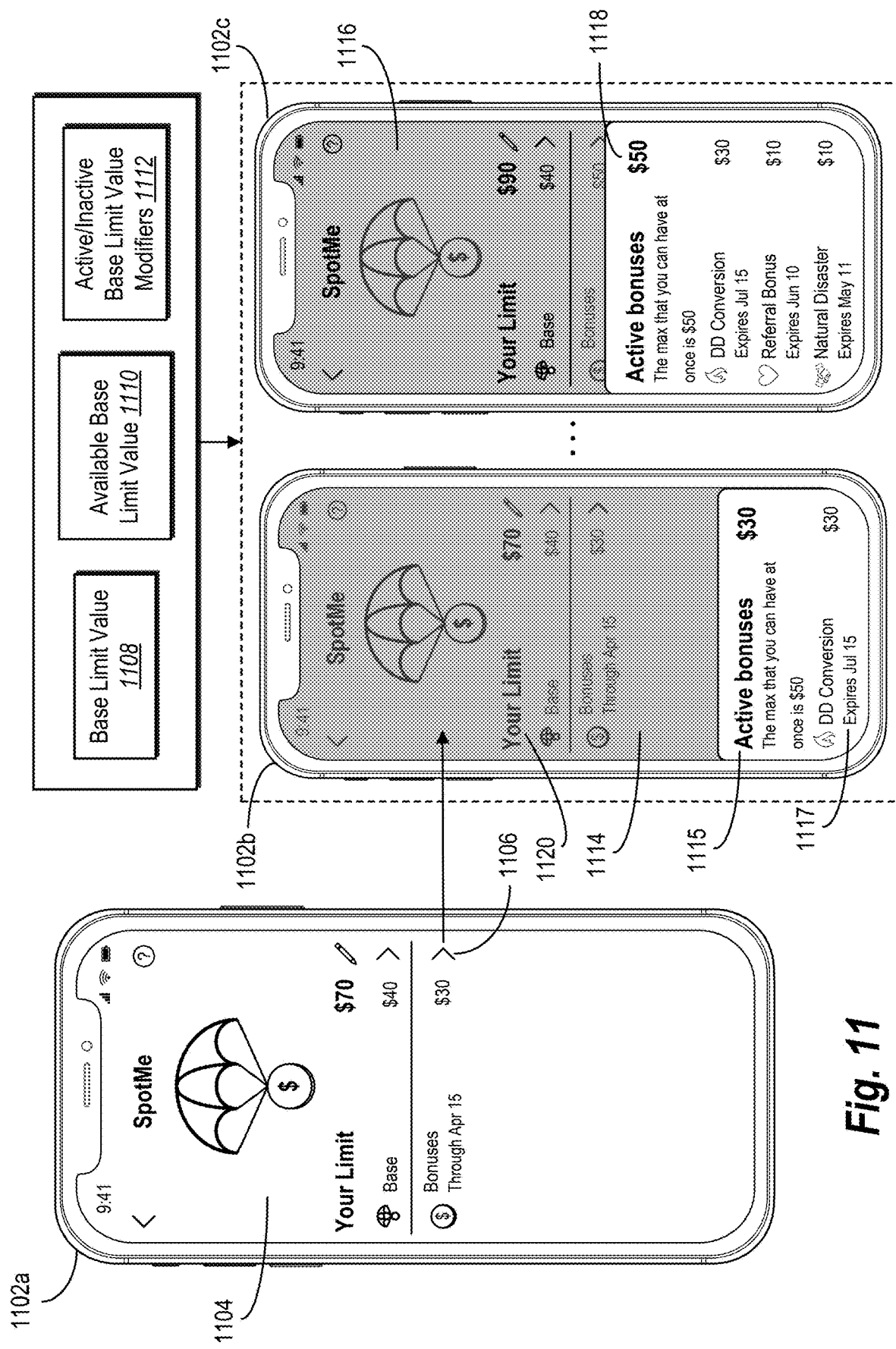
FIG. 11 illustrates a dynamic base limit value modification system displaying base limit value modifiers in accordance with one or more implementations.

Furthermore, as shown in FIG. 11, the dynamic base limit value modification system 106 displays base limit value modifiers for a user account. Indeed, as shown in FIG. 11, the dynamic base limit value modification system 106 provides, for display within a graphical user interface 1104 within a client device 1102a, a selectable user interface element 1106 for a total base limit value modifier (as described in FIG. 10A). As further shown in FIG. 11, upon receiving a user interaction with the selectable user interface element 1106, the dynamic base limit value modification system 106 transitions to (or displays) the graphical user interface 1114 (based on a transition of the client device 1102a and the client device 1102b).

For instance, as shown in FIG. 11, the dynamic base limit value modification system 106 provides, for display within the graphical user interface 1114, in a first user interface element, the available base limit value 1120 and a base limit value (e.g., based on the base limit value 1108, base limit value 1110, and active/inactive base limit value modifiers 1112). Furthermore, as also shown in FIG. 11, the dynamic base limit value modification system 106 provides, for display within the graphical user interface 1114, in a second user interface element, active modifiers 1115 (e.g., a total amount of active modifiers for the base limit value). Indeed, as shown in FIG. 11, the dynamic base limit value modification system 106 also displays, within the second user interface element of the graphical user interface 1114, an active base limit value modifier 1117 (e.g., $30) for the active modifiers 1115 (e.g., $30) based on the active/inactive base limit value modifiers 1112.

In one or more embodiments, the dynamic base limit value modification system 106 can determine multiple active base limit value modifiers from the active/inactive base limit value modifiers 1112 (in accordance with one or more implementations herein). For example, as shown in FIG. 11, the dynamic base limit value modification system 106 can provide, for display a graphical user interface 1116 within the client device 1102c, active modifier 1118 (e.g., a total amount of active modifiers for the base limit value) based on multiple active modifiers. Indeed, as shown in FIG. 11, the dynamic base limit value modification system 106 displays, within the graphical user interface 1116, multiple active base limit value modifiers that when combined result in the active modifier 1118.

In one or more instances, as shown in FIG. 11, the dynamic base limit value modification system 106 further indicates information associated with the (active) base limit value modifier 1117. For example, as shown in FIG. 11, the dynamic base limit value modification system 106 indicates an expiration time (e.g., "Expires July 15") for the (active) base limit value modifier 1117. Indeed, upon a time lapse corresponding to the expiration time, the dynamic base limit value modification system 106 can remove the (active) base limit value modifier 1117 (from the user account).

As mentioned above, the dynamic base limit value modification system 106 can provide, for display within a graphical user interface, a first interface element to present an available base limit value, a second interface element to present active base limit value modifiers, and a third interface element to present inactive base limit value modifiers in relation to a user account. For instance, FIG. 12 illustrates the dynamic base limit value modification system 106 providing, for display within a graphical user interface, one or more inactive base limit value modifiers determined for a user account.

Figure 12:
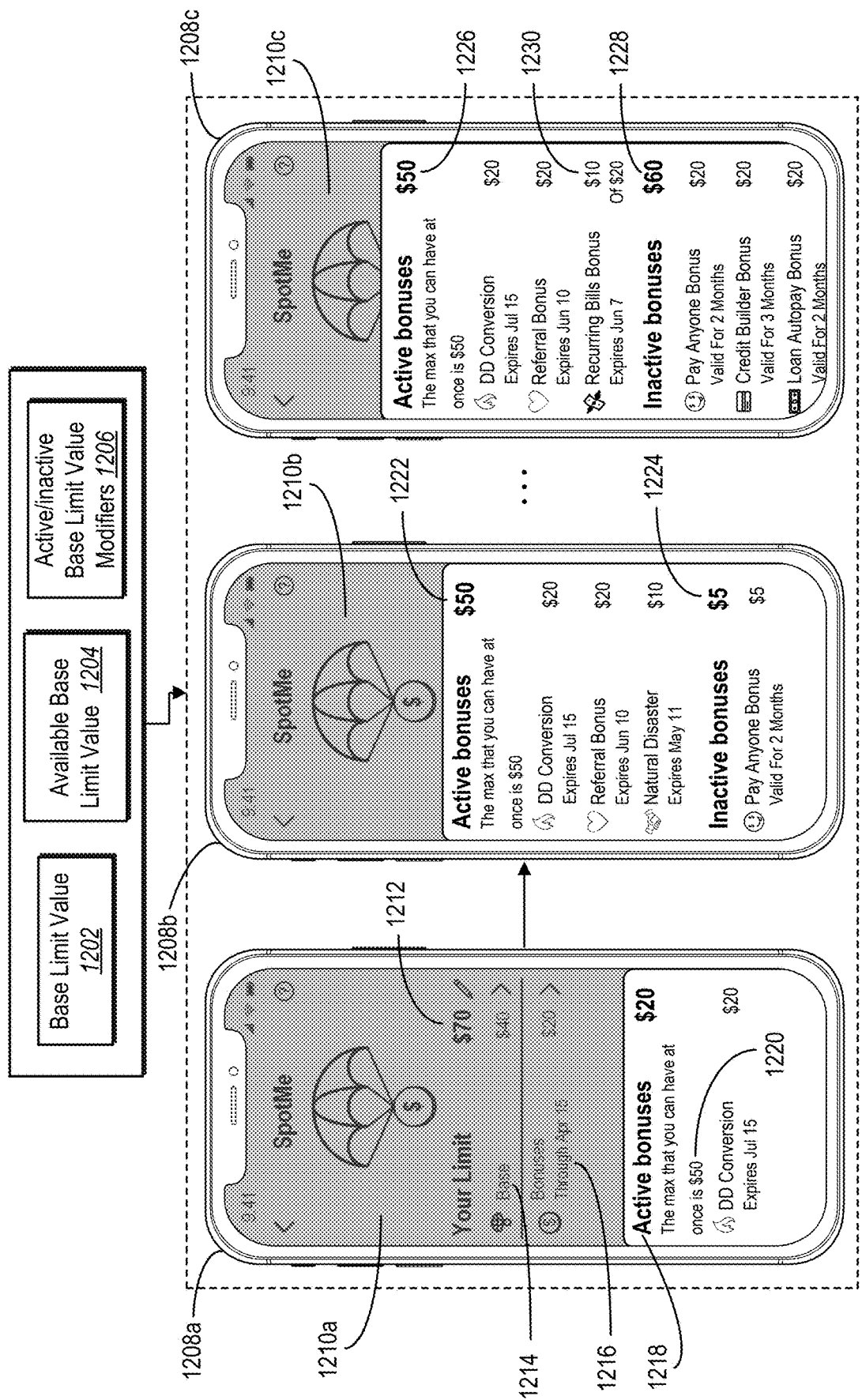
FIG. 12 illustrates a dynamic base limit value modification system displaying inactive base limit value modifiers in accordance with one or more implementations.

As shown in FIG. 12, the dynamic base limit value modification system 106 utilizes the base limit value 1202, the available base limit value 1204, and active/inactive base limit value modifiers 1206 to provide, for display in a graphical user interface 1210a of a client device 1208a, a first interface element displaying an available base limit value 1212, a base limit value 1214, and a total active base limit value modifier 1216. In addition, within a second interface element 1218 of the graphical user interface 1210*a*, the dynamic base limit value modification system 106 displays a section to display information for active base limit value modifiers. As illustrated in FIG. 12, the dynamic base limit value modification system 106 indicates within the second interface element 1218 that a single active base limit value modifier of $20 is available in the user account.

Additionally, as shown in FIG. 12, the dynamic base limit value modification system 106 can also display a total base limit value modifier threshold. Indeed, as shown in FIG. 12, the dynamic base limit value modification system 106 displays a total base limit value modifier threshold 1220 by indicating a maximum amount of base limit value modifiers that can be active for a user account (e.g., "The max that you can have at once is $50"). In one or more instances, the dynamic base limit value modification system 106 can modify the display of the total base limit value modifier threshold upon receiving (or determining) an updated total base limit value modifier threshold.

Moreover, upon determining additional base limit value modifiers, the dynamic base limit value modification system 106 can determine and display active and/or inactive base limit value modifiers in relation to the total base limit value modifier threshold 1220. For instance, as shown in FIG. 12, the dynamic base limit value modification system 106, upon determining additional base limit value modifiers as active and/or inactive in accordance with one or more implementations herein, provides, for display within a graphical user interface 1210*b* of the client device 1208*b* (as a transition from the client device 1208*a*), both active and inactive base limit value modifiers.

Indeed, as shown in FIG. 12, the dynamic base limit value modification system 106 displays active base limit value modifiers in an interface element 1222 (e.g., indicating multiple active base limit value modifiers and a total amount of the active modifiers). Additionally, as shown in FIG. 12, the dynamic base limit value modification system 106 also displays within an interface element 1224, a base limit value modifier that exceeded the total base limit value modifier threshold 1220 as an inactive base limit value modifier.

Moreover, the dynamic base limit value modification system 106 can display a varying number of active and/or inactive base limit value modifiers for a user account. Indeed, FIG. 12 illustrates an example of the dynamic base limit value modification system 106 displaying a varying number of active and/or inactive base limit value modifiers for the user account. As shown in FIG. 12, the dynamic base limit value modification system 106 can also provide, for display within a graphical user interface 1210*c* in the client device 1208*c*, active base limit value modifiers in an interface element 1226 (e.g., indicating multiple active base limit value modifiers and a total amount of the active modifiers). Furthermore, as shown in FIG. 12, the dynamic base limit value modification system 106 also displays within an interface element 1228, multiple base limit value modifiers that exceeded the total base limit value modifier threshold 1220 as inactive base limit value modifiers.

In some cases, the dynamic base limit value modification system 106 can utilize partial amounts from a base limit value modifier to maximize a total base limit value modifier threshold. For instance, as shown in FIG. 12, the dynamic base limit value modification system 106 can provide, for display within the interface element 1226, active base limit value modifier 1230 with a partial value. Indeed, the dynamic base limit value modification system 106 can determine that a partial value from a base limit value modifier falls within the total base limit value modifier threshold and utilizes the partial amount to maximize the total base limit value modifier threshold. For instance, as shown in FIG. 12, the dynamic base limit value modification system 106 displays, within the interface element 1226 the active base limit value modifier 1230 to utilize a partial amount (e.g., $10 out of $20) to meet (or maximize) the total base limit value modifier threshold 1220.

Moreover, in one or more instances, the dynamic base limit value modification system 106 dynamically modifies a graphical user interface upon detecting updates in base limit value modifier settings. For example, the dynamic base limit value modification system 106 can determine a change in base limit value modifiers (e.g., a removal and/or addition of a base limit value modifier) and/or an updated total base limit value modifier threshold (as described above). In response to the change, the dynamic base limit value modification system 106 can modify a display of the base limit value modifiers. As an example, FIG. 13 illustrates a dynamic base limit value modification system 106 dynamically modifying a graphical user interface to transition an inactive base limit value modifier as an active base limit value modifier for a user account.

Figure 13:
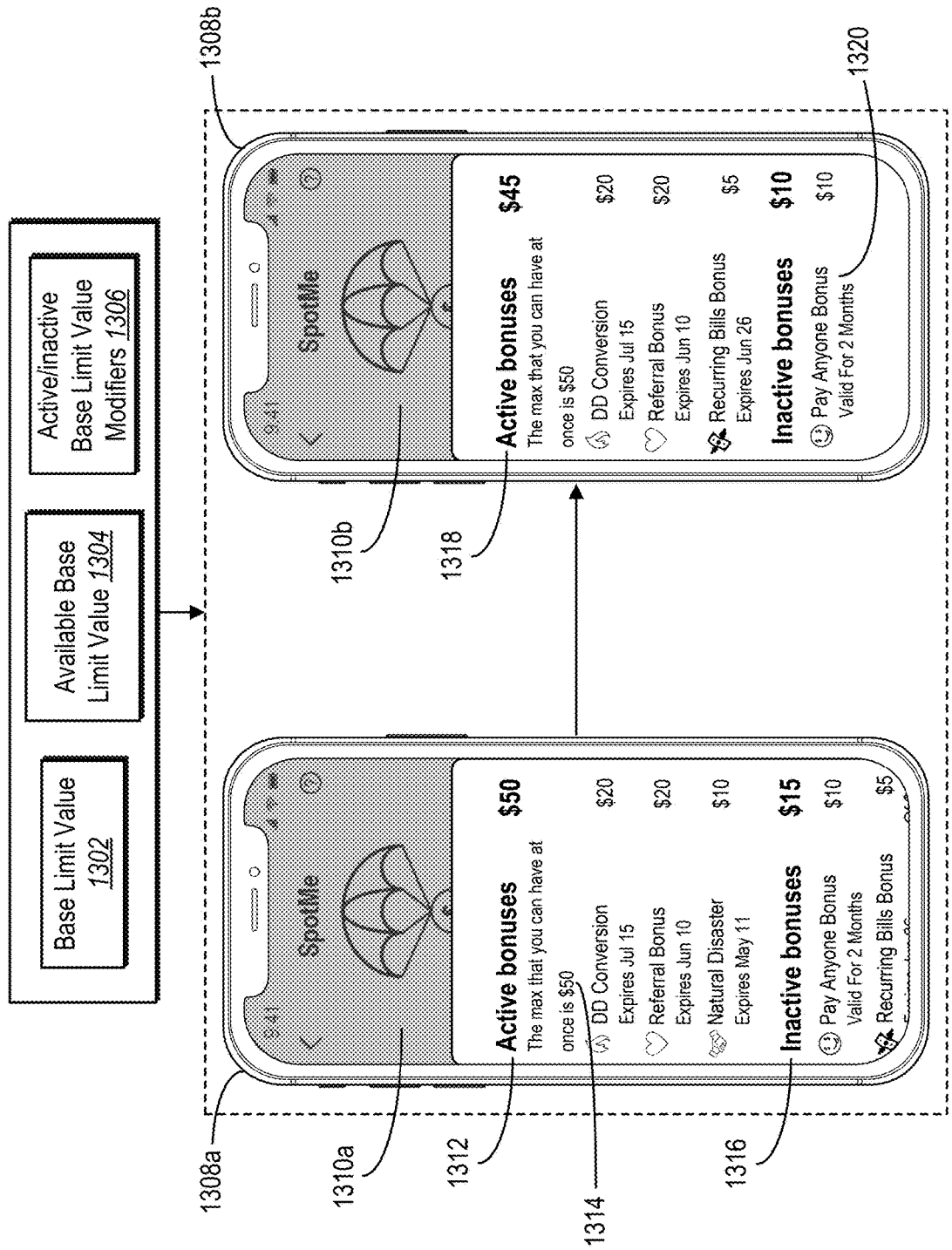
FIG. 13 illustrates a dynamic base limit value modification system dynamically modifying a graphical user interface to transition an inactive base limit value modifier as an active base limit value modifier in accordance with one or more implementations.

As shown in FIG. 13, the dynamic base limit value modification system 106 utilizes a base limit value 1302, an available base limit value 1304, and active/inactive base limit value modifiers 1306 determined for a user account (in accordance with one or more embodiments) to generate graphical user interfaces for the user account. Indeed, as shown in FIG. 13, the dynamic base limit value modification system 106 provides, for display within a graphical user interface 1310*a* in a client device 1308*a*, an interface element 1312 to display active base limit value modifiers within a total base limit value modifier threshold 1314. In addition, as shown in FIG. 13, the dynamic base limit value modification system 106 provides, for display within the graphical user interface 1310*a*, an additional interface element 1316 to display inactive base limit value modifiers that exceed a total base limit value modifier threshold 1314.

Furthermore, as shown in the transition from the graphical user interface 1310*a* to a graphical user interface 1310*b* (in a client device 1308*b*), the dynamic base limit value modification system 106 can determine one or more updates to the active/inactive base limit value modifiers 1306. For instance, as shown in FIG. 13, the dynamic base limit value modification system 106 identifies a removal of a particular active base limit value modifier for the user account (e.g., a base limit value modifier corresponding to the event "Natural Disaster"). Upon removal of the active base limit value modifier, the dynamic base limit value modification system 106 modifies the graphical user interface 1310*b* to move an inactive base limit value modifier from an additional interface element 1320 to an interface element 1318 displaying active base limit value modifiers. Specifically, as illustrated in FIG. 13, the dynamic base limit value modification system 106 identifies an inactive base limit value modifier that when added to the active base limit value modifiers does not exceed the total base limit value modifier threshold 1314 (e.g., the inactive modifier of $5 resulting in a total active modifier of $45 which falls within the threshold of $50). Moreover, as shown in FIG. 13, the dynamic base limit value modification system 106 moves the identified inactive base limit value modifier (e.g., "Recurring Bills Bonus") to the interface element 1318 to transition the base limit value modifier from an inactive state to an active state. Indeed, the dynamic base limit value modification system 106 can select inactive base limit value modifiers to transition to an active state in accordance with one or more implementations herein.

Although one or more embodiments herein illustrate the dynamic base limit value modification system 106 transitioning a certain number of inactive base limit value modifiers to active base limit value modifiers (and/or removing a certain number of active base limit value modifiers), the dynamic base limit value modification system 106 can transition various numbers of active and/or inactive base limit value modifiers. For instance, the dynamic base limit value modification system 106 can transition various inactive base limit value modifiers to an active state and display the inactive base limit value modifiers as active (in a graphical user interface). Furthermore, the dynamic base limit value modification system 106 can add and/or remove various numbers of active base limit value modifiers. Additionally, the dynamic base limit value modification system 106 can add and/or remove various numbers of inactive base limit value modifiers.

In some cases, the dynamic base limit value modification system 106 can display selectable interface elements (or options) to initiate digital actions and/or initiate base limit value modifiers for a user account. As an example, in some cases, the dynamic base limit value modification system 106 can provide, for display within a graphical user interface, selectable user interface elements that upon interaction initiate a digital user account action that enables a particular base limit value modifier for a user account and/or enables the application of base limit value modifiers for the user account. Indeed, the dynamic base limit value modification system 106 can display the selectable user interface element to initiate the digital user account action that enables navigation to one or more GUIs to fulfill the digital user account action.

As an example, FIG. 14 illustrates the dynamic base limit value modification system 106 displaying selectable user interface elements to initiate a digital user account action for base limit value modifiers. As shown in FIG. 14, the dynamic base limit value modification system 106 provides, for display within a graphical user interface 1410a in a client device 1408a, an interface element 1412 indicating active and inactive base limit value modifiers that are withheld from application (e.g., "paused") in a user account pending a digital user account action. Moreover, as shown in FIG. 14, the dynamic base limit value modification system 106 provides, for display within the graphical user interface 1410a, a selectable interface element 1414 to initiate a digital user account action (e.g., "set up direct deposit").

As shown in FIG. 14, the dynamic base limit value modification system 106, upon receiving a user interaction with the selectable interface element 1414, transitions a display of the graphical user interface 1410a to a display of graphical user interface 1410b (in a client device 1408b). As shown in FIG. 14, the dynamic base limit value modification system 106 displays within the graphical user interface 1410b, selectable options to fulfill a digital user account action. Indeed, as shown in FIG. 14, the dynamic base limit value modification system 106 provides, for display within the graphical user interface 1410b, a selectable interface element 1416 to initiate an integration between a user account of the inter-network facilitation system and a third-party account (e.g., an employer or payroll account) to fulfill a digital user account action (e.g., setting up a direct deposit). As also shown in FIG. 14, the dynamic base limit value modification system 106 provides, for display within the graphical user interface 1410b, a selectable interface element 1418 to automatically generate and transmit a direct deposit form via email to fulfill the digital user account action (e.g., setting up a direct deposit). Upon completion of the digital user account action within the graphical user interface 1410b, the dynamic base limit value modification system 106 initiates the active and inactive base limit value modifiers that are withheld from application (e.g., "paused") in the user account (in accordance with one or more implementations herein).

Although FIG. 14 illustrates a specific digital user account action, the dynamic base limit value modification system 106 can display (and facilitate) various selectable interface elements to initiate and/or fulfill various digital user account actions. Indeed, the dynamic base limit value modification system 106 can display (and facilitate) one or more selectable interface elements to initiate and/or fulfill one or more digital user account actions (as described above).

Furthermore, although FIG. 14 illustrates the dynamic base limit value modification system 106 facilitating selectable interface elements to fulfill a digital user account action to enable base limit value modifiers in a user account, the dynamic base limit value modification system 106 can also display and facilitate various selectable interface elements to initiate and/or fulfill one or more digital user account actions to generate (or apply) a specific base limit value modifier to a user account. As an example, the dynamic base limit value modification system 106 can provide, for display within a graphical user interface, a selectable interface element to initiate a digital user account action (as shown in FIG. 14), that upon completion, adds a particular base limit value modifier to the user account. Upon receiving user interactions to complete the digital user account action, the dynamic base limit value modification system 106 can add the base limit value modifier corresponding to the digital user account action to the user account (in accordance with one or more implementations herein).

In one or more instances, the dynamic base limit value modification system 106 receives a user network transaction (e.g., a purchase transaction, cash transfer transaction) within the user account. Upon determining that the user network transaction exceeds a user account value (e.g., an account balance) corresponding to the user account, the dynamic base limit value modification system 106 can utilize an available base limit value (e.g., determined using a base limit value and active base limit value modifiers in accordance with one or more implementations herein) to cover a portion of the user network transaction that exceeds the user account value. Subsequently, in some instances, upon receiving a deposit transaction within the user account (e.g., a direct deposit, a check deposit, a cash deposit) for the user account value, the dynamic base limit value modification system 106 deducts the utilized portion of the available base limit value from the deposit transaction. In some cases, when a deposit transaction is not received, the dynamic base limit value modification system 106 deactivates future utilization of the available base limit value for the user account.

Figure 15:
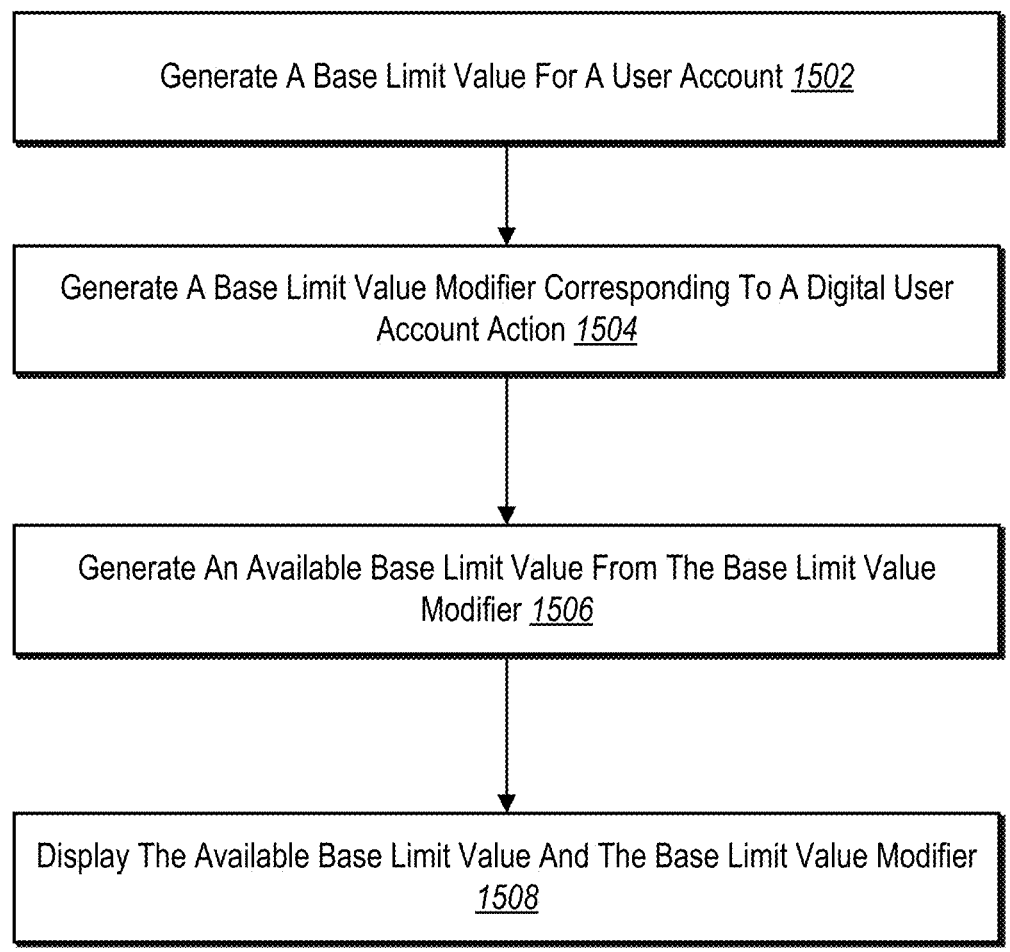
FIG. 15 illustrates a flowchart of a series of acts for displaying an available base limit value and one or more base limit value modifiers in accordance with one or more implementations.

Turning now to FIG. 15, this figure shows a flowchart of a series of acts 1500 for displaying an available base limit value and one or more base limit value modifiers in accordance with one or more implementations. While FIG. 15 illustrates acts according to one embodiment, alternative embodiments may omit, add to, reorder, and/or modify any of the acts shown in FIG. 15. The acts of FIG. 15 can be performed as part of a method. Alternatively, a non-transitory computer readable storage medium can comprise instructions that, when executed by the one or more processors, cause a computing device to perform the acts depicted in FIG. 15. In still further embodiments, a system can perform the acts of FIG. 15.

As shown in FIG. 15, the series of acts 1500 include an act 1502 of generating a base limit value for a user account, an act 1504 of generating a base limit value modifier corresponding to a digital user account action, an act 1506 of generating an available base limit value from the base limit value modifier, and an act 1508 of displaying the available base limit value and the base limit value modifier.

In some embodiments, the act 1502 includes generating, utilizing a machine learning model, a base limit value representing an excess utilization buffer for a user account, the act 1504 includes, in response to detecting a first digital user account action, generating a base limit value modifier corresponding to the first digital user account action, the act 1506 includes, in response to determining that the base limit value modifier falls within a total base limit value modifier threshold, generating an available base limit value by combining the base limit value modifier and the base limit value, and the act 1508 includes providing, for display within a graphical user interface, a first element indicating the available base limit value and a second element indicating the base limit value modifier.

Additionally, the series of acts 1500 can include, in response to detecting a second digital user account action, generating an additional base limit value modifier corresponding to the second digital user account action. Moreover, the series of acts 1500 can include, in response to determining that the additional base limit value modifier falls within the total base limit value modifier threshold, generating the available base limit value by combining the base limit value modifier, the additional base limit value modifier, and the base limit value. Furthermore, the series of acts 1500 can include providing, for display within the graphical user interface, the second element indicating the base limit value modifier and the additional base limit value modifier as active. In addition, the series of acts 1500 can include providing, for display within the graphical user interface, the second element indicating the base limit value modifier with a representation of the first digital user account action.

Moreover, the series of acts 1500 can include, in response to detecting a second digital user account action, generating an additional base limit value modifier corresponding to the second digital user account action. In some instances, the series of acts 1500 include, based on the base limit value modifier and an additional base limit value modifier not falling within the total base limit value modifier threshold, setting the additional base limit value modifier in an inactive state. Furthermore, the series of acts 1500 can include providing, for display within the graphical user interface, a third element indicating the additional base limit value modifier in the inactive state. In addition, the series of acts 1500 can include providing, for display within the graphical user interface, the second element indicating the base limit value modifier with a first representation of the first digital user account action and providing, for display within the graphical user interface, the third element indicating the additional base limit value modifier with a second representation of the second digital user account action.

Furthermore, the series of acts 1500 can include, upon detecting a transition of the additional base limit value modifier to an active state from the inactive state, moving, within the graphical user interface, a display of the additional base limit value modifier to the second element. Moreover, the series of acts 1500 can include, upon detecting a removal of the base limit value modifier corresponding to the first digital user account action, transitioning the additional base limit value modifier from the inactive state to an active state and generating the available base limit value by combining the additional base limit value modifier and the base limit value.

Additionally, the series of acts 1500 can include detecting an updated total base limit value modifier threshold based on an increase in the total base limit value modifier threshold. Moreover, the series of acts 1500 can include, in response to determining that the base limit value modifier and the additional base limit value modifier falls within the updated total base limit value modifier threshold, transitioning the additional base limit value modifier from the inactive state to an active state and generating the available base limit value by combining the base limit value modifier, the additional base limit value modifier, and the base limit value.

In some cases, the series of acts 1500 include detecting the first digital user account action by providing, for display within an additional graphical user interface, a selectable option to initiate the first digital user account action and receiving, from a client device, a user interaction with the selectable option initiating the first digital user account action.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
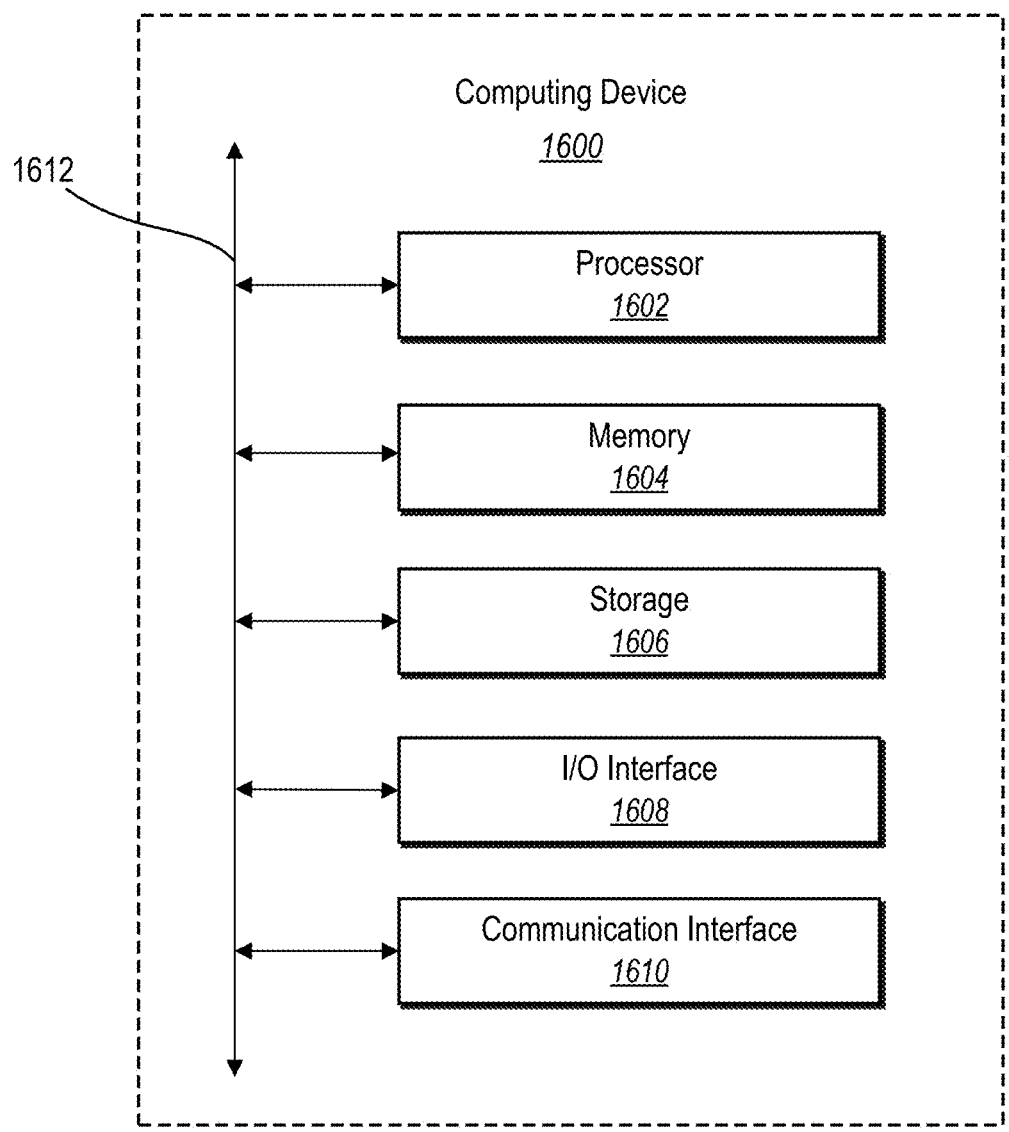
FIG. 16 illustrates a block diagram of an exemplary computing device in accordance with one or more implementations.

FIG. 16 illustrates, in block diagram form, an exemplary computing device 1600 that may be configured to perform one or more of the processes described above. One will appreciate that the dynamic base limit value modification system 106 (or the inter-network facilitation system 104) can comprise implementations of a computing device, including, but not limited to, the devices or systems illustrated in the previous figures. As shown by FIG. 16, the computing device can comprise a processor 1602, memory 1604, a storage device 1606, an I/O interface 1608, and a communication interface 1610. In certain embodiments, the computing device 1600 can include fewer or more components than those shown in FIG. 16. Components of computing device 1600 shown in FIG. 16 will now be described in additional detail.

In particular embodiments, processor(s) 1602 includes hardware for executing instructions, such as those making up a computer program. As an example, and not by way of limitation, to execute instructions, processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 includes storage for storing data or instructions. As an example, and not by way of limitation, storage device 1606 can comprise a non-transitory storage medium described above. The storage device 1606 may include a hard disk drive ("HDD"), flash memory, a Universal Serial Bus ("USB") drive or a combination of these or other storage devices.

The computing device 1600 also includes one or more input or output ("I/O") interface 1608, which are provided to allow a user (e.g., requester or provider) to provide input to (such as user strokes), receive output from, and otherwise transfer data to and from the computing device 1600. These I/O interface 1608 may include a mouse, keypad or a keyboard, a touch screen, camera, optical scanner, network interface, modem, other known I/O devices or a combination of such I/O interface 1608. The touch screen may be activated with a stylus or a finger.

The I/O interface 1608 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 1608 is configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 can provide one or more interfaces for communication (such as, for example, packet-based communication) between the computing device and one or more other computing devices 1600 or one or more networks. As an example, and not by way of limitation, communication interface 1610 may include a network interface controller ("NIC") or network adapter for communicating with an Ethernet or other wire-based network or a wireless NIC ("WNIC") or wireless adapter for communicating with a wireless network, such as a WI-FI. The computing device 1600 can further include a bus 1612. The bus 1612 can comprise hardware, software, or both that couples components of computing device 1600 to each other.

Figure 17:
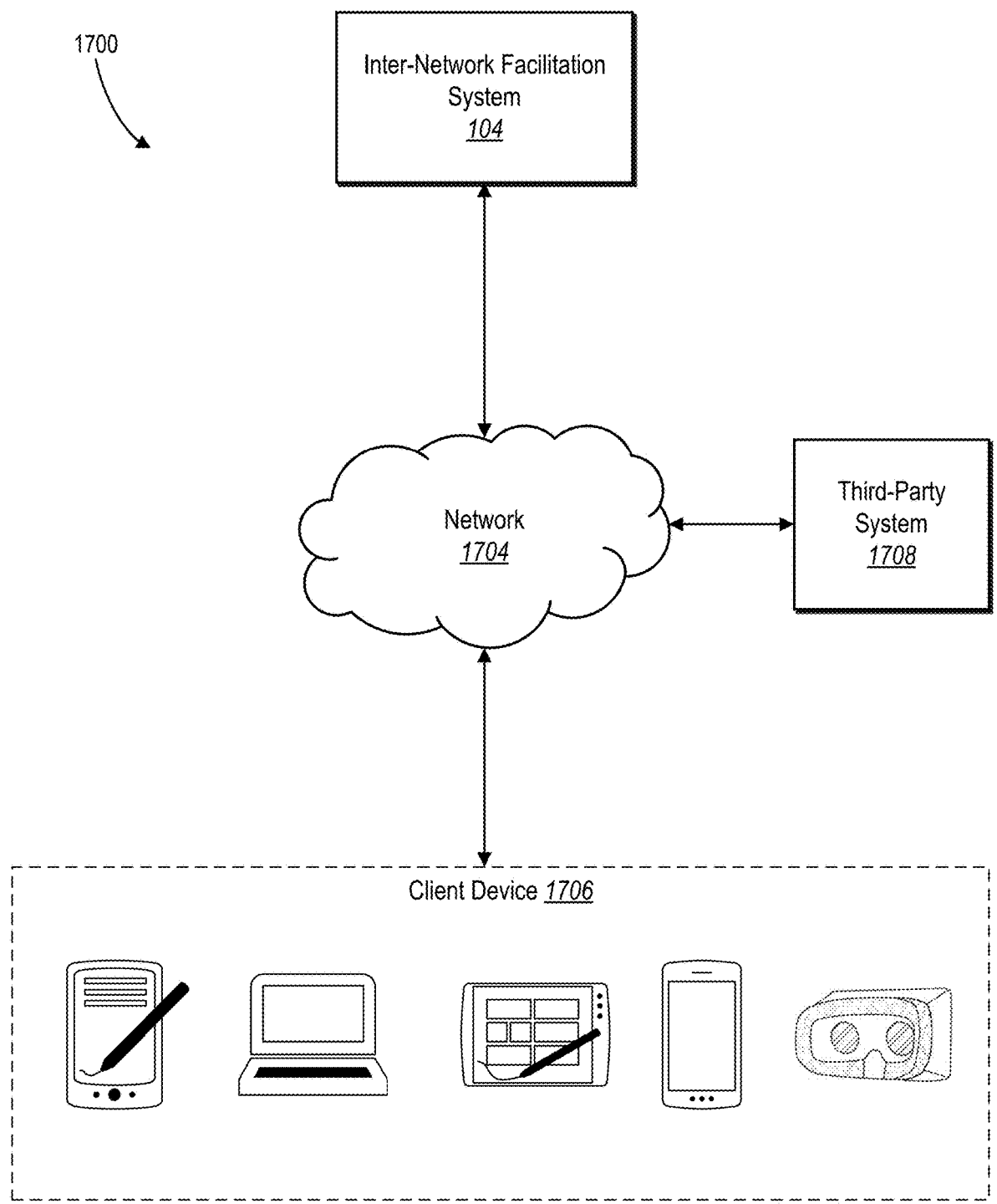
FIG. 17 illustrates an example environment for an inter-network facilitation system in accordance with one or more implementations.

FIG. 17 illustrates an example network environment 1700 of the inter-network facilitation system 104. The network environment 1700 includes a client device 1706 (e.g., client device 110), an inter-network facilitation system 104, and a third-party system 1708 connected to each other by a network 1704. Although FIG. 17 illustrates a particular arrangement of the client device 1706, the inter-network facilitation system 104, the third-party system 1708, and the network 1704, this disclosure contemplates any suitable arrangement of client device 1706, the inter-network facilitation system 104, the third-party system 1708, and the network 1704. As an example, and not by way of limitation, two or more of client device 1706, the inter-network facilitation system 104, and the third-party system 1708 communicate directly, bypassing network 1704. As another example, two or more of client device 1706, the inter-network facilitation system 104, and the third-party system 1708 may be physically or logically co-located with each other in whole or in part.

Moreover, although FIG. 17 illustrates a particular number of client devices 1706, inter-network facilitation systems 104, third-party systems 1708, and networks 1704, this disclosure contemplates any suitable number of client devices 1706, inter-network facilitation system 104, third-party systems 1708, and networks 1704. As an example, and not by way of limitation, network environment 1700 may include multiple client devices 1706, inter-network facilitation system 104, third-party systems 1708, and/or networks 1704.

This disclosure contemplates any suitable network 1704. As an example, and not by way of limitation, one or more portions of network 1704 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1704 may include one or more networks 1704.

Links may connect client device 1706, inter-network facilitation system 104 (e.g., which hosts the dynamic base limit value modification system 106), and third-party system 1708 to network 1704 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1700. One or more first links may differ in one or more respects from one or more second links.

In particular embodiments, the client device 1706 may be an electronic device including hardware, software, or embedded logic components or a combination of two or more such components and capable of carrying out the appropriate functionalities implemented or supported by client device 1706. As an example, and not by way of limitation, a client device 1706 may include any of the computing devices discussed above in relation to FIG. 16. A client device 1706 may enable a network user at the client device 1706 to access network 1704. A client device 1706 may enable its user to communicate with other users at other client devices 1706.

In particular embodiments, the client device 1706 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1706 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1706 one or more Hyper Text Markup Language ("HTML") files responsive to the HTTP request. The client device 1706 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1704) to link the third-party-system 1708. For example, the inter-network facilitation system 104 may receive authentication credentials from a user to link a third-party system 1708 such as an online bank account, credit account, debit account, or other financial account to a user account within the inter-network facilitation system 104. The inter-network facilitation system 104 can subsequently communicate with the third-party system 1708 to detect or identify balances, transactions, withdrawal, transfers, deposits, credits, debits, or other transaction types associated with the third-party system 1708. The inter-network facilitation system 104 can further provide the aforementioned or other financial information associated with the third-party system 1708 for display via the client device 1706. In some cases, the inter-network facilitation system 104 links more than one third-party system 1708, receiving account information for accounts associated with each respective third-party system 1708 and performing operations or transactions between the different systems via authorized network connections.

In particular embodiments, the inter-network facilitation system 104 may interface between an online banking system and a credit processing system via the network 1704. For example, the inter-network facilitation system 104 can provide access to a bank account of a third-party system 1708 and linked to a user account within the inter-network facilitation system 104. Indeed, the inter-network facilitation system 104 can facilitate access to, and transactions to and from, the bank account of the third-party system 1708 via a client application of the inter-network facilitation system 104 on the client device 1706. The inter-network facilitation system 104 can also communicate with a credit processing system, an ATM system, and/or other financial systems (e.g., via the network 1704) to authorize and process credit charges to a credit account, perform ATM transactions, perform transfers (or other transactions) across accounts of different third-party systems 1708, and to present corresponding information via the client device 1706.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1708), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1700 either directly or via network 1704. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1706, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1704.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1706. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1706. Information may be pushed to a client device 1706 as notifications, or information may be pulled from client device 1706 responsive to a request received from client device 1706. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1706 associated with users.

In addition, the third-party system 1708 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1704. A third-party system 1708 can communicate with the inter-network facilitation system 104 to provide financial information pertaining to balances, transactions, and other information, whereupon the inter-network facilitation system 104 can provide corresponding information for display via the client device 1706. In particular embodiments, a third-party system 1708 communicates with the inter-network facilitation system 104 to update account balances, transaction histories, credit usage, and other internal information of the inter-network facilitation system 104 and/or the third-party system 1708 based on user interaction with the inter-network facilitation system 104 (e.g., via the client device 1706). Indeed, the inter-network facilitation system 104 can synchronize information across one or more third-party systems 1708 to reflect accurate account information (e.g., balances, transactions, etc.) across one or more networked systems, including instances where a transaction (e.g., a transfer) from one third-party system 1708 affects another third-party system 1708.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    determining a base limit value for a digital user account indicating an excess utilization buffer for the digital user account by:
        selecting, utilizing user activity data corresponding to the digital user account, an activity machine learning model from a plurality of activity machine learning models, wherein each of the plurality of activity machine learning models comprise learned parameters specific to different sets of user activity training data from different groupings of digital user accounts;
        generating an activity score utilizing the activity machine learning model from user activity data of the digital user account; and
        utilizing the activity score with a base limit value model to determine the base limit value;
    in response to detecting a first digital user account action, determining a base limit value modifier mapped to the first digital user account action from a set of base limit value modifiers mapped to a set of digital user account actions;
    in response to determining that the base limit value modifier falls within a total base limit value modifier threshold and detecting the first digital user account action, generating an available base limit value by adding the base limit value modifier to the base limit value; and
    providing, for display within a graphical user interface, a first element indicating the available base limit value and a second element indicating the base limit value modifier.

2. The computer-implemented method of claim 1, further comprising:
    in response to detecting a second digital user account action, determining an additional base limit value modifier corresponding to the second digital user account action; and
    in response to determining that the additional base limit value modifier falls within the total base limit value modifier threshold, generating the available base limit value by combining the base limit value modifier, the additional base limit value modifier, and the base limit value.

3. The computer-implemented method of claim 2, further comprising providing, for display within the graphical user interface, the second element indicating the base limit value modifier and the additional base limit value modifier as active.

4. The computer-implemented method of claim 1, further comprising providing, for display within the graphical user interface, the second element indicating the base limit value modifier with a representation of the first digital user account action.

5. The computer-implemented method of claim 1, further comprising:
    in response to detecting a second digital user account action, determining an additional base limit value modifier corresponding to the second digital user account action; and
    based on the base limit value modifier and an additional base limit value modifier not falling within the total base limit value modifier threshold, setting the additional base limit value modifier in an inactive state.

6. The computer-implemented method of claim 5, further comprising providing, for display within the graphical user interface, a third element indicating the additional base limit value modifier in the inactive state.

7. The computer-implemented method of claim 6, further comprising:
    providing, for display within the graphical user interface, the second element indicating the base limit value modifier with a first representation of the first digital user account action; and
    providing, for display within the graphical user interface, the third element indicating the additional base limit value modifier with a second representation of the second digital user account action.

8. The computer-implemented method of claim 6, further comprising, upon detecting a transition of the additional base limit value modifier to an active state from the inactive state, moving, within the graphical user interface, a display of the additional base limit value modifier to the second element.

9. The computer-implemented method of claim 5, further comprising, upon detecting a removal of the base limit value modifier corresponding to the first digital user account action:
    transitioning the additional base limit value modifier from the inactive state to an active state; and
    generating the available base limit value by combining the additional base limit value modifier and the base limit value.

10. The computer-implemented method of claim 5, further comprising:
    detecting an updated total base limit value modifier threshold based on an increase in the total base limit value modifier threshold; and
    in response to determining that the base limit value modifier and the additional base limit value modifier falls within the updated total base limit value modifier threshold:
        transitioning the additional base limit value modifier from the inactive state to an active state; and
        generating the available base limit value by combining the base limit value modifier, the additional base limit value modifier, and the base limit value.

11. A non-transitory computer-readable medium storing instructions that, when executed by at least one processor, cause the at least one processor to perform operations comprising:
    determining a base limit value for a digital user account indicating an excess utilization buffer for the digital user account by:
        selecting, utilizing user activity data corresponding to the digital user account, an activity machine learning model from a plurality of activity machine learning models, wherein each of the plurality of activity machine learning models comprise learned parameters specific to different sets of user activity training data from different groupings of digital user accounts;
        generating an activity score utilizing the activity machine learning model from user activity data of the digital user account; and
        utilizing the activity score with a base limit value model to determine the base limit value;
    in response to detecting a first digital user account action, determining a base limit value modifier mapped to the first digital user account action from a set of base limit value modifiers mapped to a set of digital user account actions;
    in response to determining that the base limit value modifier falls within a total base limit value modifier threshold and detecting the first digital user account action, generating an available base limit value by adding the base limit value modifier to the base limit value; and
    providing, for display within a graphical user interface, a first element indicating the available base limit value and a second element indicating the base limit value modifier.

12. The non-transitory computer-readable medium of claim 11, wherein the operations further comprise:
    in response to detecting a second digital user account action, determining an additional base limit value modifier corresponding to the second digital user account action;
    in response to determining that the additional base limit value modifier falls within the total base limit value modifier threshold, generating the available base limit value by combining the base limit value modifier, the additional base limit value modifier, and the base limit value; and
    providing, for display within the graphical user interface, the second element indicating the base limit value modifier and the additional base limit value modifier as active.

13. The non-transitory computer-readable medium of claim 11, wherein the operations further comprise:
    in response to detecting a second digital user account action, determining an additional base limit value modifier corresponding to the second digital user account action;
    based on the base limit value modifier and an additional base limit value modifier not falling within the total base limit value modifier threshold, setting the additional base limit value modifier in an inactive state; and
    providing, for display within the graphical user interface, a third element indicating the additional base limit value modifier in the inactive state.

14. The non-transitory computer-readable medium of claim 13, wherein the operations further comprise, upon detecting a transition of the additional base limit value modifier to an active state from the inactive state, moving, within the graphical user interface, a display of the additional base limit value modifier to the second element.

15. The non-transitory computer-readable medium of claim 14, wherein the operations further comprise detecting the transition of the additional base limit value modifier to an active state from the inactive state based on:
    detecting a removal of the base limit value modifier corresponding to the first digital user account action; or
    determining that the base limit value modifier and the additional base limit value modifier falls within an updated total base limit value modifier threshold.

16. A system comprising:
    at least one processor; and
    at least one non-transitory computer-readable storage medium storing instructions that, when executed by the at least one processor, cause the system to:
        determine a base limit value for a digital user account indicating an excess utilization buffer for the digital user account by:
            selecting, utilizing user activity data corresponding to the digital user account, an activity machine learning model from a plurality of activity machine learning models, wherein each of the plurality of activity machine learning models comprise learned parameters specific to different sets of user activity training data from different groupings of digital user accounts;
            generating an activity score utilizing the activity machine learning model from user activity data of the digital user account; and
            utilizing the activity score with a base limit value model to determine the base limit value;
        in response to detecting a first digital user account action, determine a base limit value modifier mapped to the first digital user account action from a set of base limit value modifiers mapped to a set of digital user account actions;

in response to determining that the base limit value modifier falls within a total base limit value modifier threshold and detecting the first digital user account action, generate an available base limit value by adding the base limit value modifier and to the base limit value; and provide, for display within a graphical user interface, a first element indicating the available base limit value and a second element indicating the base limit value modifier.

17. The system of claim 16, further comprising instructions that, when executed by the at least one processor, cause the system to:

in response to detecting a second digital user account action, generate an additional base limit value modifier corresponding to the second digital user account action; and in response to determining that the additional base limit value modifier falls within the total base limit value modifier threshold, generate the available base limit value by combining the base limit value modifier, the additional base limit value modifier, and the base limit value.

18. The system of claim 17, further comprising instructions that, when executed by the at least one processor, cause the system to provide, for display within the graphical user interface, the second element indicating the base limit value modifier with a representation of the first digital user account action and a second representation of the second digital user account action.

19. The system of claim 16, further comprising instructions that, when executed by the at least one processor, cause the system to:

in response to detecting a second digital user account action, generate an additional base limit value modifier corresponding to the second digital user account action;

based on the base limit value modifier and an additional base limit value modifier not falling within the total base limit value modifier threshold, set the additional base limit value modifier in an inactive state;

provide, for display within the graphical user interface, the second element indicating the base limit value modifier with a representation of the first digital user account action; and provide, for display within the graphical user interface, a third element indicating the additional base limit value modifier in the inactive state with a representation of the second digital user account action.

20. The system of claim 19, further comprising instructions that, when executed by the at least one processor, cause the system to detect the first digital user account action by:

providing, for display within an additional graphical user interface, a selectable option to initiate the first digital user account action; and receiving, from a client device, a user interaction with the selectable option initiating the first digital user account action.

* * * * *